US006678501B1

(12) United States Patent
Valeski

(10) Patent No.: US 6,678,501 B1
(45) Date of Patent: Jan. 13, 2004

(54) METHOD AND APPARATUS FOR VEHICULAR ORDERING OF RADIO-BASED PROGRAMS

(75) Inventor: Judson C. Valeski, Boulder, CO (US)

(73) Assignee: America Online Incorporated, Dulles, VA (US)

( * ) Notice: Subject to any disclaimer, the term of this patent is extended or adjusted under 35 U.S.C. 154(b) by 0 days.

(21) Appl. No.: 09/422,131

(22) Filed: Oct. 20, 1999

(51) Int. Cl.$^{7}$ .......................... H04H 9/00; H04M 1/66; H04M 1/00; H04B 1/06

(52) U.S. Cl. .................... 455/3.04; 455/3.05; 455/3.06; 455/410; 455/411; 455/563; 455/414.1; 455/344; 455/345; 725/123

(58) Field of Search ............................ 705/26; 455/344, 455/3.03, 3.04, 3.05, 3.06, 412, 414, 418, 419, 422, 466, 345, 39, 500, 550, 556, 569, 565, 563; 725/110, 122, 116, 131, 123

(56) References Cited

U.S. PATENT DOCUMENTS

| | | | | | |
|---|---|---|---|---|---|
| 4,843,385 A | * | 6/1989 | Borras | 340/5.33 |
| 4,887,308 A | | 12/1989 | Dutton | 455/156 |
| 5,144,649 A | | 9/1992 | Zicker et al. | 379/59 |
| 5,214,792 A | | 5/1993 | Alwadish | 455/45 |
| 5,475,585 A | | 12/1995 | Bush | 364/401 |
| 5,538,635 A | | 7/1996 | Mazewski et al. | 210/617 |
| 5,539,635 A | | 7/1996 | Larson, Jr. | 364/401 |
| 5,553,965 A | | 9/1996 | Fuss et al. | 403/291 |
| 5,907,793 A | * | 5/1999 | Reams | 455/45 |
| 6,078,807 A | * | 6/2000 | Dunn et al. | 455/410 |
| 6,088,585 A | * | 7/2000 | Schmitt et al. | 340/5.83 |

FOREIGN PATENT DOCUMENTS

| | | | | |
|---|---|---|---|---|
| FR | 2759829 | | 2/1997 | 7/26 |
| WO | WO 98/11750 | | 3/1998 | 7/38 |
| WO | WO 99/08238 | * | 2/1999 | G07F/7/10 |
| WO | WO 99/35771 | | 7/1999 | |
| WO | WO 99/35809 | | 7/1999 | 3/50 |
| WO | WO 99/44380 | | 9/1999 | 7/32 |

OTHER PUBLICATIONS

*What is RDS?* Oct. 13, 1999 www.cemacity.org/MALL/product/audio/files/rds.html.

* cited by examiner

*Primary Examiner*—Lee Nguyen
*Assistant Examiner*—Raymond B. Persino
(74) *Attorney, Agent, or Firm*—Glenn Patent Group; Michael A. Glenn

(57) ABSTRACT

A method of use provides an extremely efficient manner of ordering a radio program occurring at approximately the time presented, minimizing the need to remember any details. The method is embodied in a range of tactile and voice controls which people in motion need to have. Security options include voice signatures, button sequences and fingerprint identification. User feedback is embodied in both audio and visual display formats. A method of controlling a radio is claimed which provides for placing an order, querying the ordering system for additional information, initializing a user's identifying signature, initializing a session by identifying a user, if the user is not properly identified, blocking access to ordering, and in certain embodiments, calling the police. A radio device is claimed supporting an IF signal source containing essential information on the radio program, an embedded controller, user interface as well as a radio transceiver by which the ordering transaction is carried out.

36 Claims, 27 Drawing Sheets

METHOD AND APPARATUS FOR VEHICULAR ORDERING OF RADIO-BASED PROGRAMS

TECHNICAL FIELD

This invention relates to an ordering method and apparatus for broadcast radio programs used by a person in motion.

BACKGROUND ART

Many people spend significant amounts of time traveling on a regular basis. Commuters using automobiles and mass transport fill the streets and transportation depots of many metropolitan areas several times a day for many hours. Others using bicycles and other wheeled vehicles are seen not only at rush hours, but also at other times throughout the week and on holidays. Still others prefer to long distance running and walking. All of these people have the opportunity to purchase radio receivers which enable them to enjoy broadcast radio programs of a wide variety, including entertainment such as music, dramatic productions, comedies, interviews, story telling sessions, as well as news and other factual radio programs including investment shows as well as advertisements and/or commercials.

FIG. 1 depicts typical prior art vehicular radio receivers and cellular telephones. The basic receiver 10 of today often possesses an indicator 2 visually presenting some status information, such as whether the FM receiver is active, and if so, its tuner frequency. There is often a door 4 permitting loading and unloading of audio recording media, such as cassette tapes or CD's. Other alternatives include downloaded audio files on nonvolatile memory components. There is usually an array of push buttons 6, which may be arranged in a variety of configurations, which may or may not form a regular pattern. Sometimes there are dials 8. This basic receiver 10 is usually able to receive both AM and FM broadcasts as well as often play recorded material such as cassette tapes or CDs. Audio output is often achieved in automobiles using speakers 12 and 14 coupled to the receiver 10 by wires 16 and 18, respectively.

Other kinds of commuters and travelers usually cannot afford the space of separately detached speakers. Another solution includes a headset 20 including left and right speakers 22 and 24 sometimes with all the electronics for broadcast radio reception being resident in the headset 20, sometimes with an antenna 30. Volume and tuning controls 26 are often mounted on the earphone-speaker sections such as 22. Batteries 28 are often mounted in the headset 20 as shown. A further progression includes an addition of microphone 34 attached by a mount 32 to the headset. Still further refinements include cabling 40 to a unit 42, which is often mounted on a belt.

This belt-mounted unit 42 often contains the active electronic components of the basic receiver 10 discussed above. Belt-mounted unit 42 often further contains an indicator 44 visually presenting some status information, a door 46 permitting loading and unloading of audio recording media and an array of push buttons 48. Such units 42 usually receive both AM and FM broadcasts as well as often play recorded material such as cassette tapes or CDs.

Some performing artists use versions of devices resembling these units 20-40-42 in place of hand held microphones and headsets. In such circumstances, the units act as transceivers, similar to cellular telephones, although with higher fidelity than standard cellular telephones.

Additionally, cellular telephones 50 possessing a microphone 52 and earphone 54, a push button array 56 and sometimes an antenna 58 have become common throughout much of the world.

FIG. 2 depicts a simplified block diagram of a typical, prior art broadcast radio receiver. FM antenna 100 is coupled 102 to FM Tuner 104. FM Tuner 104 is coupled 106 to FM Intermediate Frequency Processor (IF) 108, from which the stereo audio signals 110 are presented to Analog Multiplexer/Switch 150. AM antenna 120 is coupled 122 to AM Tuner 124. AM Tuner 124 presents the audio signal 126 to Analog Multiplexer/Switch 150. Tape drive 140 is coupled 142 to Tape Preamp 144. Tape Preamp 144 presents the stereo audio signals 146 to Analog Multiplexer/Switch 150.

Analog Multiplexer/Switch 150 is usually manually controlled to select from a collection of inputs such as discussed above. It generates one or more audio signals 162 which are presented to Tone and Volume Control 160, which generates audio signals 166 which are presented to one or more power amplifiers 164. Power amplifiers 164 generate one or more audio signals presented 170 to Audio Speaker System 168. The Audio Speaker System 168 involves one or more speakers, which may reside in a headset, rigidly mounted on the sides of an enclosure such as a boom box, or distributed some distance from each other, as in an automobile. Often the mechanism of presentation 170 to the audio speaker system is through a wire-based physical transport layer, but in certain situations, it may be through a wireless physical transport layer. These systems have been a staple of the consumer electronics market for a quarter of a century, remaining virtually unchanged in that time. However, there are some frustrations associated with such systems and the above mentioned cellular telephones.

There is a subsidiary FM signal protocol known as RDS in the United States (and often referred to as RDBS in Europe), which has been adopted and deployed in a number of radio markets within the United States. RDS specifies a sub-band within the channel bandwidth of a standard FM broadcast station, which does not interfere with the audio sub-band of the FM transmission. The sub-band is currently used to broadcast digital information such as standard identification information of the standard broadcast station. From certain perspectives, this sub-band can be viewed as a sub-carrier used for additional analog and/or digital information.

FIG. 3 depicts an exemplary prior art mobile computer 200 capable of being installed in an automobile. Computer 200 typically is designed to mount on or near the dashboard of an automobile, but could conceptually be mounted on the handle bars of a bicycle. Assembly 202-204-206 acts as a selection device similar in some ways to a mouse or joy stick. Push plate 204, when depressed away from its center, selects a region such as 206. Region 202 in certain situations contains a number of designations useful in selecting specific common options. Display 210 portrays the state of the computer, providing the main user output. Buttons 208, 212, 214 and 216 provide a further array of user tactile inputs.

Systems such as this have recently come onto the market here in the United States. Many of these systems run handheld computer operating systems and often feature menu driven control systems further accessing one or more nonvolatile memory systems, such as CDs, disk drives or nonvolatile semiconductor memories. However, even with such new systems, there are some frustrations associated with this kind of device and the above mentioned radio receivers and cellular telephones.

Consider the situation where there is an interest in buying a copy of the radio program either being heard or having just been heard. How is this to be done? Today one faces an inherently frustrating situation. One approach is to somehow note what was played. One might call some distributor on the telephone to order the radio program. This is often at least distracting, if not dangerous, for motorists, whose life and health, as well as the lives and health of those around them, depends upon them staying focused on driving. For other most people in motion, simultaneously dealing with a cellular telephone and a broadcast radio receiver would be quite inconvenient, if not again distracting and potentially dangerous.

One might wait to visit a store selling such merchandise. This requires that somehow one remember what was played and who performed it at the least. In almost all the situations described above, this is again inconvenient, distracting and potentially dangerous.

An alternative would be to note the radio program, channel and broadcast time and use this information to order the radio program. Such a system has been recently granted a patent (U.S. Pat. No. 5,539,635). Characteristic of such systems is the following description of the user's actions to order a radio program taken from the Summary of the Invention (column 2, lines 18–21). "A customer uses her telephone to call into the system and gives the date, time, and broadcaster of when she heard each requested program broadcasted." This would again be inconvenient, distracting and in many circumstances for people in motion, dangerous.

An additional problem confronts the user in motion: financial information disclosure. Cellular telephones can often be overheard electronically. In mass transports, people in the vicinity of a user may well overhear critical identifying information such as credit card or subscriber numbers. Similar situations often occur for individuals on bicycles and on foot.

What is needed is a method of ordering radio programs which is convenient, extremely easy to perform while in motion and simultaneously capable of being secure. What is also needed is a class of radio devices supporting such methods of ordering. What is also needed is a method of controlling such radio devices so users may order radio programs in the manners discussed hereinafter.

Disclosure of the Invention

The present invention answers all of these needs. The method of use presents an extremely efficient manner of ordering a radio program occurring at approximately the time presented, minimizing the need to remember any details. The method is embodied in a range of tactile and voice controls which people in motion need to have. Security options include voice signatures, button sequences and fingerprint identification. User feedback is embodied in both audio and visual display formats.

The radio device supports an IF signal source containing essential information on the radio program, an embedded controller, user interface as well as a radio transceiver by which the ordering transaction is carried out. The IF signal source may be digital or analog. The embedded controller contains a writeable nonvolatile memory supporting the control program and security signatures. The user interface supports push buttons, audio input and output to the user, as well as visual output to the user and a fingerprint scanner. The radio transceiver may be embodied as a cellular telephone or bidirectional pager.

The method of controlling the radio supports the basic actions of placing an order, querying the ordering system for additional information, initializing a user's identifying signature, initializing a session by identifying a user, blocking access to ordering if the user is not identified, and in certain embodiments, calling the police. In certain embodiments, the user's identifying signature may include one or more of button sequences, voice signature and fingerprint.

These and other advantages of the present invention will become apparent upon reading the following detailed descriptions and studying the various figures of the drawings.

DETAILED DESCRIPTION OF PREFERRED EMBODIMENTS

Figure 1:
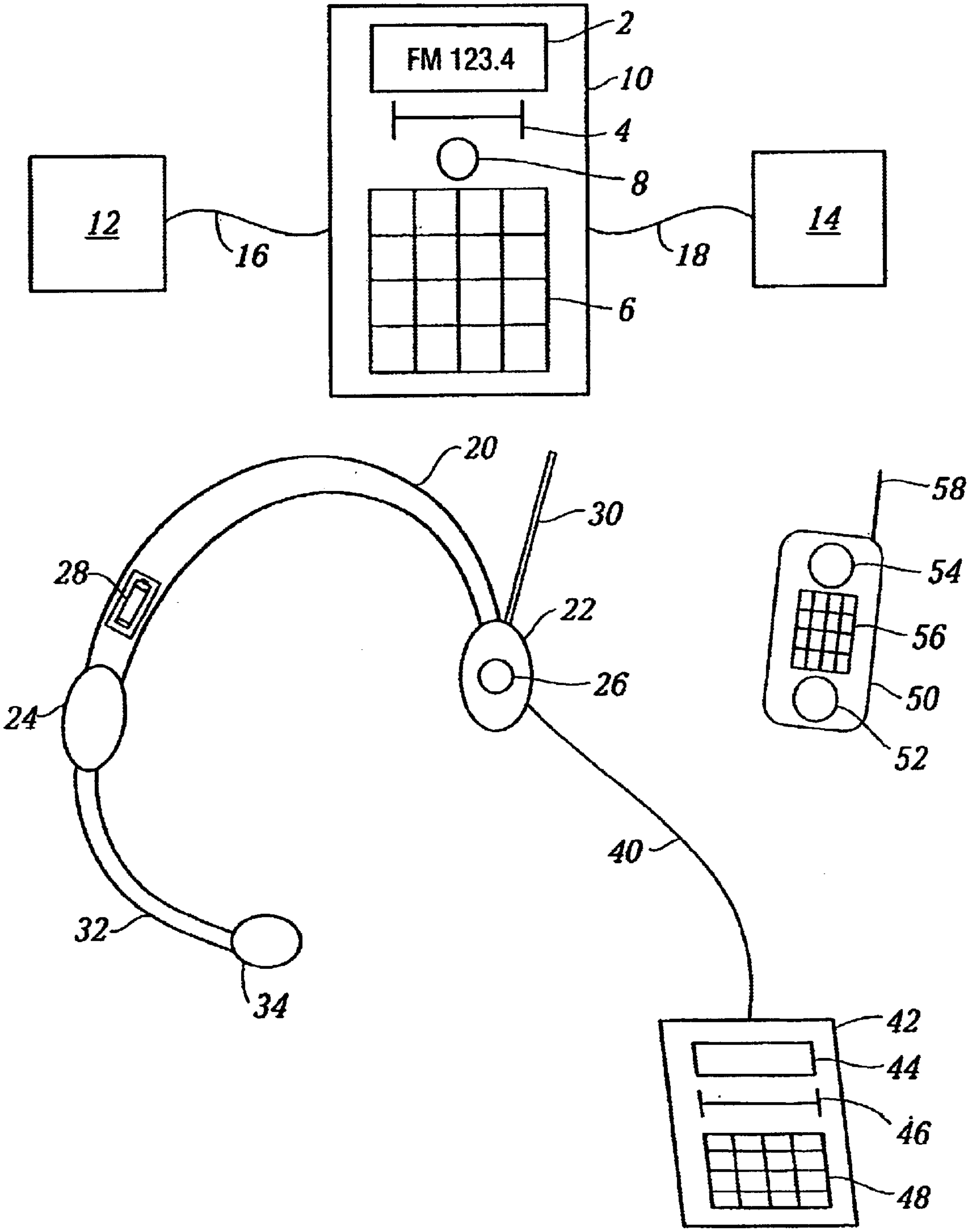
FIG. 1 (PRIOR ART)
FIG. 1 depicts typical prior art vehicular radio receivers.
Figure 2:
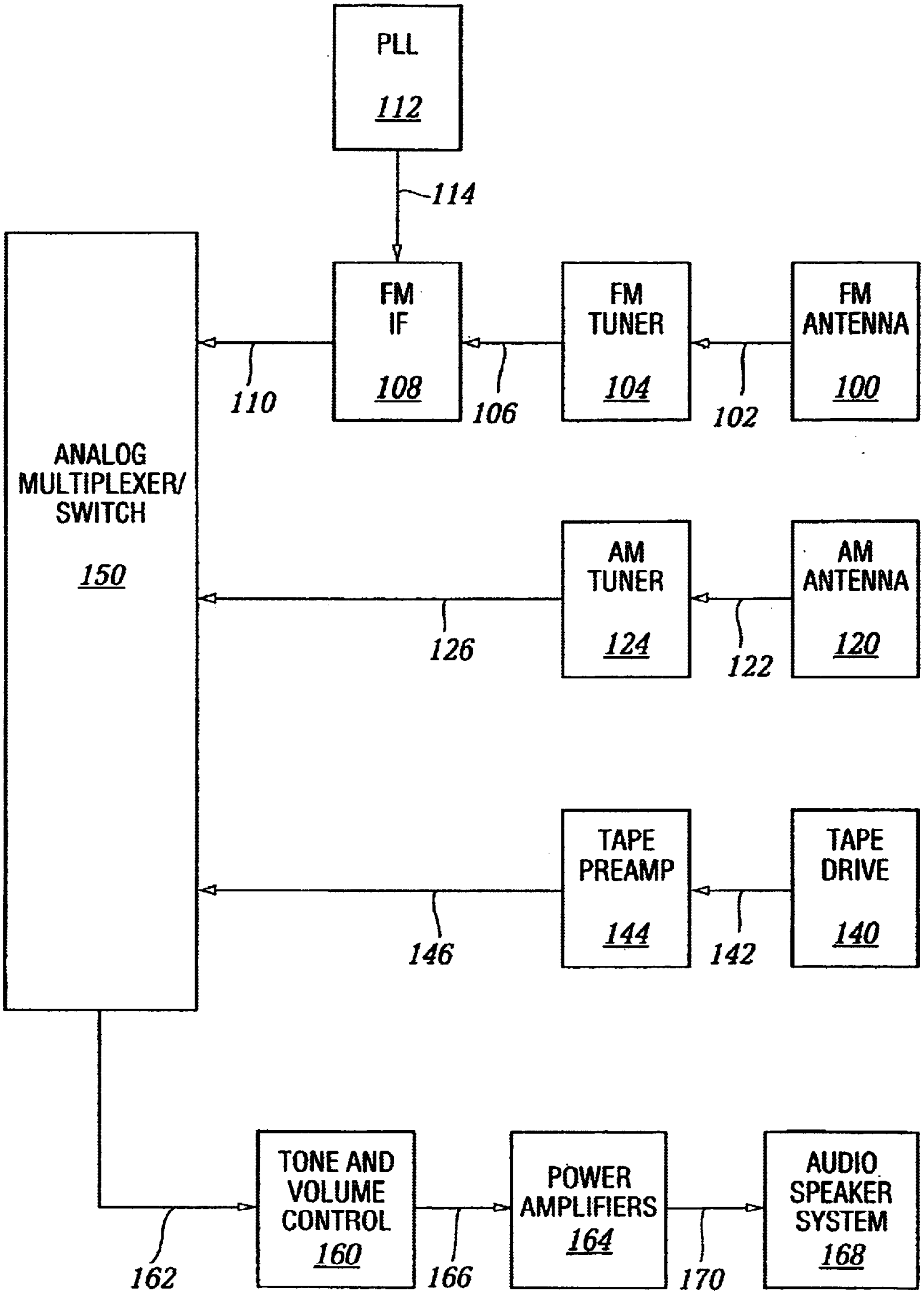
FIG. 2 (PRIOR ART)
FIG. 2 depicts a simplified block diagram of a typical, prior art broadcast radio receiver.
Figure 3:
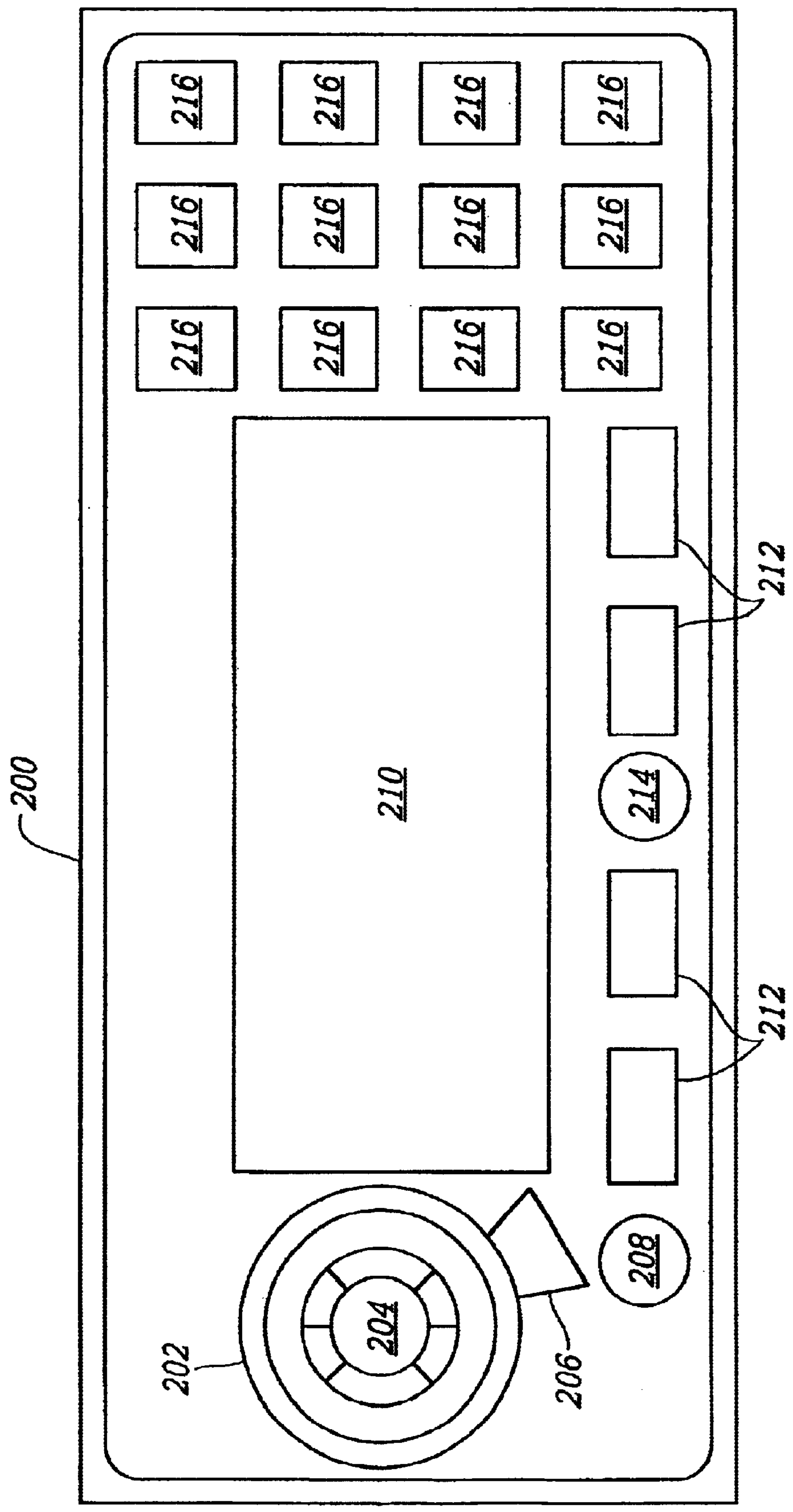
FIG. 3 (PRIOR ART)
FIG. 3 depicts an exemplary prior art mobile computer capable of being installed in an automobile.

FIGS. 1, 2 and 3 refer to prior art and were previously discussed in the Background of the Invention.

Discussion of Primary Terms as used herein:

Radio-based programs refer to recognizable programming entities available upon a wireless broadcast physical transport. Radio-based programs include but are not limited to presentations of entertainment, education, news and commentary. Such presentations include but are not limited to copyrighted music, dramatic productions, storytelling, comedies, interviews and news stories. Such presentations also include but are not limited to stock market analyses and reports as well as advertisements and commercials.

Vehicular radio refers to radio systems supporting reception of broadcast radio-based programs in venues where the listener is either in motion, such as a bicycle, running, roller blading, skateboarding, or driving an automobile, truck, van or motorcycle.

Vehicle button array refers to one or more buttons which the vehicular radio user may touch or press and which affects the operation of the vehicular radio.

Embedded controller refers to a digital control system, including but not limited to, a computer coupled to a computer readable memory. Readable memory may include more than one kind of computer memory, such as CD ROMs, disk drives, RAM, nonvolatile semiconductor memory and removable storage devices coupled to the embedded controller by a removable storage interface.

Removable storage devices include but are not limited to floppy disks, CD's, and semiconductor disks.

Writeable non-volatile memory refers to non-volatile memory including at least one accessible word which may be purposefully altered. Non-volatility memory will retain its contents when power is no longer supplied to the memory.

Figure 4:
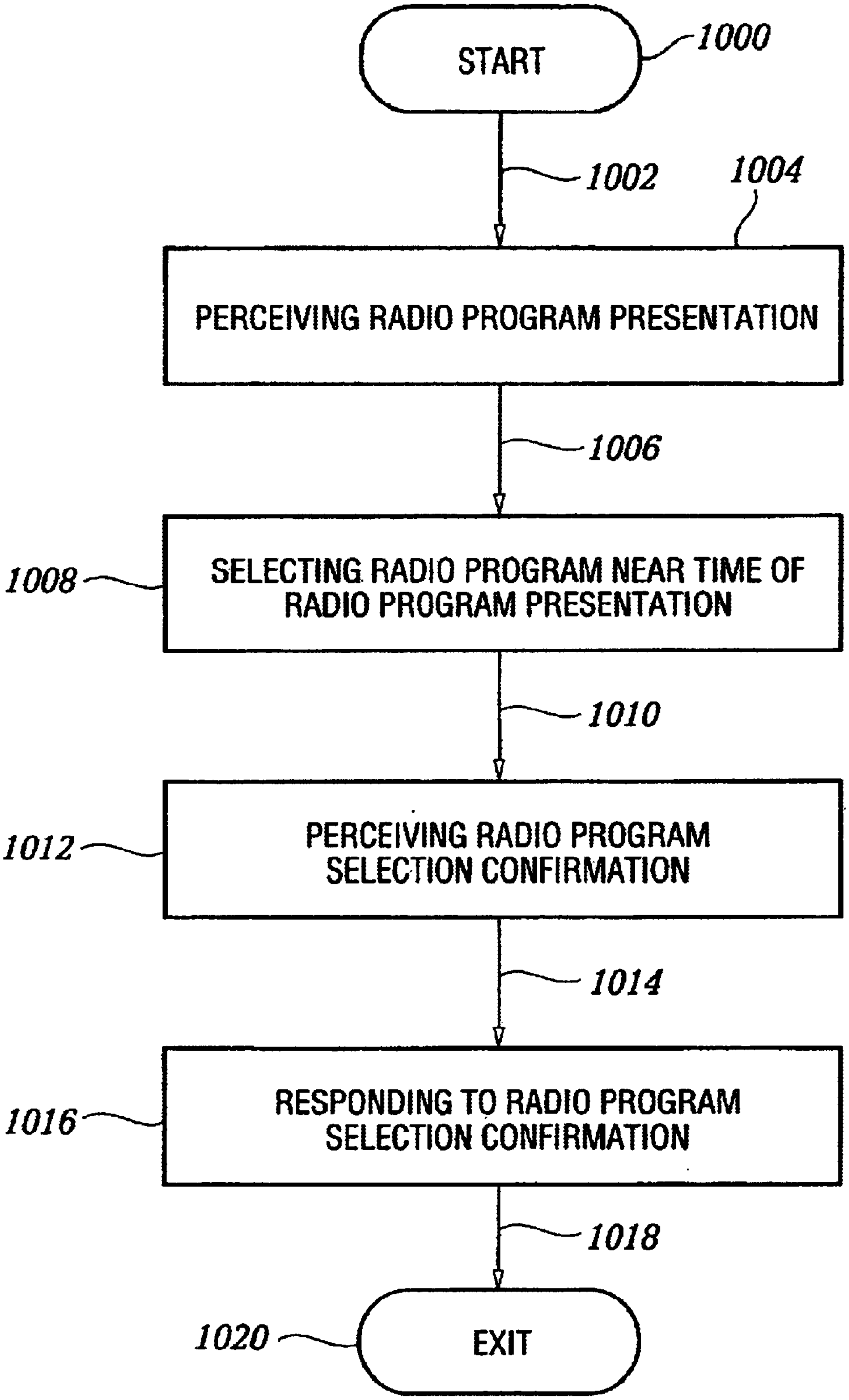
FIG. 4 depicts a flowchart of using a vehicular radio-based program selection and ordering system in accordance with an embodiment.

FIG. 4 depicts a flowchart of using a vehicular radio-based program selection and ordering system in accordance with an embodiment of the present invention. Operation 1000 starts the operations of this flowchart. Arrow 1002 directs the use from operation 1000 to operation 1004. Operation 1004 performs perceiving a radio program presentation. Arrow 1006 directs the usage from operation 1004 to operation 1008. Operation 1008 performs selecting the radio program near the time of the radio program presentation. Arrow 1010 directs the usage from operation 1008 to operation 1012. Operation 1012 performs perceiving the radio program selection confirmation. Arrow 1014 directs the usage from operation 1012 to operation 1016. Operation 1016 performs responding to the radio program selection confirmation. Arrow 1018 directs the usage from operation 1016 to operation 1020. Operation 1020 terminates the operations of this flowchart.

Figure 5:
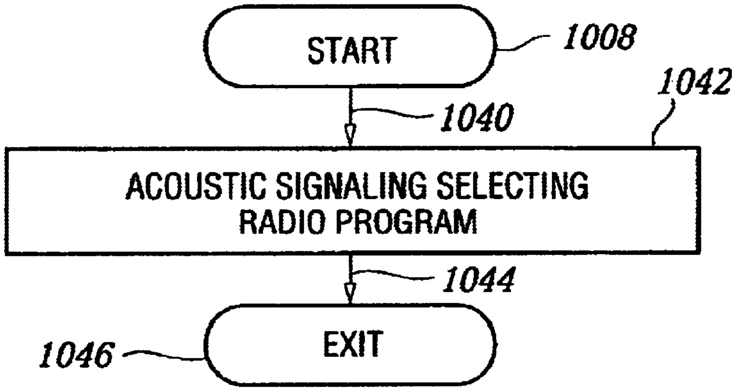
FIG. 5 depicts a detail flowchart of operation 1008 of FIG. 4, which selects the radio program near the time of the radio program presentation in accordance with certain embodiments.

FIG. 5 depicts a detail flowchart of operation 1008 of FIG. 4, which selects the radio program near the time of the radio program presentation in accordance with certain embodiments. Arrow 1040 directs the use from starting operation 1008 to operation 1042. Operation 1042 performs acoustic signaling selecting of said radio program. Arrow 1044 directs the usage from operation 1042 to operation 1046. Operation 1046 terminates the operations of this flowchart.

Figure 6:
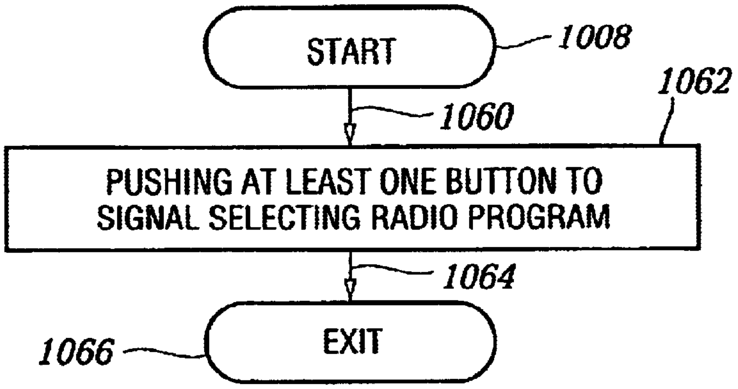
FIG. 6 depicts a detail flowchart of operation 1008 of FIG. 4, which selects the radio program near the time of the radio program presentation in accordance with certain embodiments.

FIG. 6 depicts a detail flowchart of operation 1008 of FIG. 4, which selects the radio program near the time of the radio program presentation in accordance with certain embodiments. Arrow 1060 directs the use from starting operation 1008 to operation 1062. Operation 1062 performs pushing at least one button to signal selecting of said radio program. Arrow 1064 directs the usage from operation 1062 to operation 1066. Operation 1066 terminates the operations of this flowchart.

Figure 7:
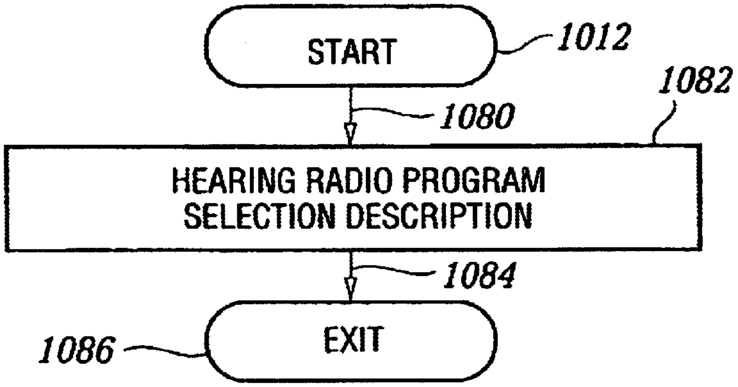
FIG. 7 depicts a detail flowchart of operation 1012 of FIG. 4, which perceives the radio program selection confirmation in accordance with certain embodiments.

FIG. 7 depicts a detail flowchart of operation 1012 of FIG. 4, which perceives the radio program selection confirmation in accordance with certain embodiments. Arrow 1080 directs the use from starting operation 1010 to operation 1082. Operation 1082 performs hearing a radio program selection description. Arrow 1084 directs the usage from operation 1082 to operation 1086. Operation 1086 terminates the operations of this flowchart.

Figure 8:
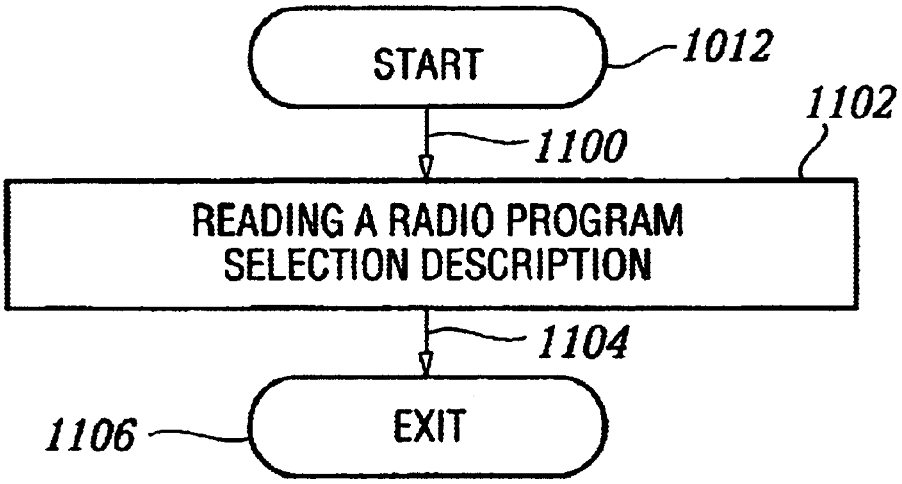
FIG. 8 depicts a detail flowchart of operation 1012 of FIG. 4, which perceives the radio program selection confirmation in accordance with certain embodiments.

FIG. 8 depicts a detail flowchart of operation 1012 of FIG. 4, which perceives the radio program selection confirmation in accordance with certain embodiments. Arrow 1100 directs the use from starting operation 1010 to operation 1102. Operation 1102 performs reading a radio program selection description. Arrow 1104 directs the usage from operation 1102 to operation 1106. Operation 1106 terminates the operations of this flowchart.

Figure 9:
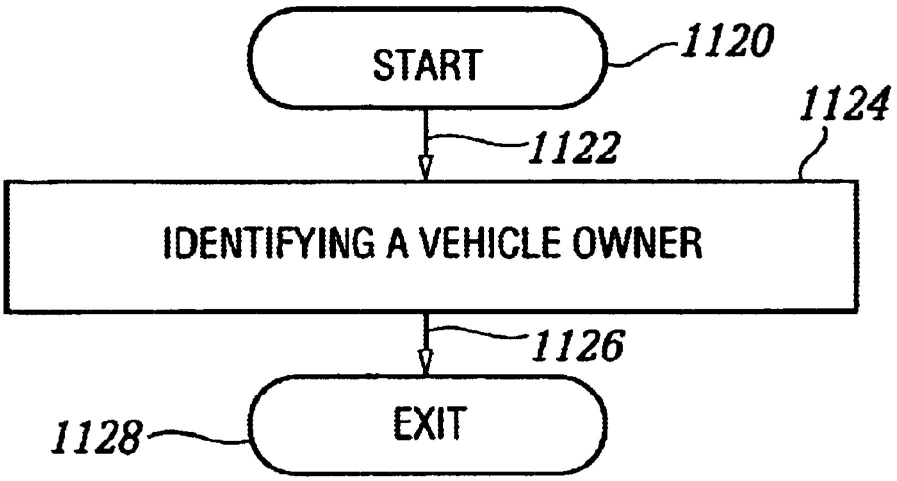
FIG. 9 depicts a flowchart of additional operation 1120 of identifying a vehicle owner to operation 1000 of FIG. 4 in accordance to certain embodiments.

FIG. 9 depicts a flowchart of additional operation 1120 of identifying a vehicle owner to operation 1000 of FIG. 4 in accordance to certain embodiments. Operation 1120 starts the operations of this flowchart. Arrow 1122 directs the use from operation 1120 to operation 1124. Operation 1124 performs identifying a vehicle owner. Arrow 1126 directs the usage from operation 1124 to operation 1128. Operation 1128 terminates the operations of this flowchart.

Figure 10:
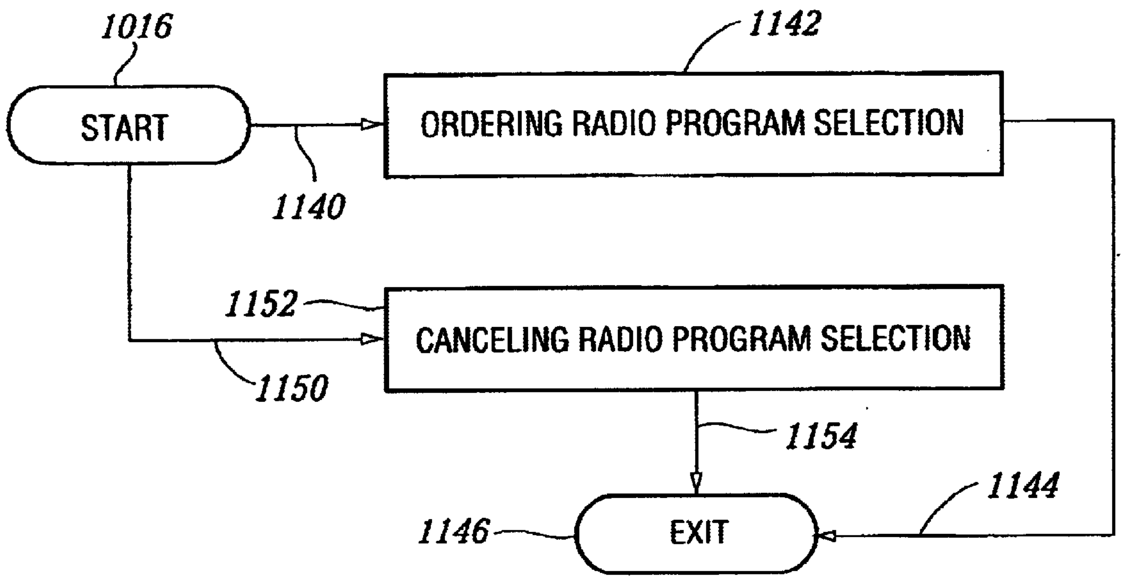
FIG. 10 depicts a detail flowchart of operation 1016 of FIG. 4 responding to radio program selection confirmation in accordance to certain embodiments.

FIG. 10 depicts a detail flowchart of operation 1016 of responding to the radio program selection confirmation in accordance to certain embodiments. Arrow 1140 directs the use from starting operation 1016 to operation 1142. Operation 1142 performs ordering the radio program selection. Arrow 1144 directs the usage from operation 1142 to operation 1146. Operation 1146 terminates the operations of this flowchart. Arrow 1150 directs the use from starting operation 1016 to operation 1152. Operation 1152 performs canceling the radio program selection. Arrow 1154 directs the usage from operation 1152 to operation 1146. Operation 1146 terminates the operations of this flowchart.

Note that usage may either perform ordering the radio program selection or canceling the radio program selection. Cancellation may be automatic in certain embodiments after a certain predetermined time interval has elapsed.

Figure 11:
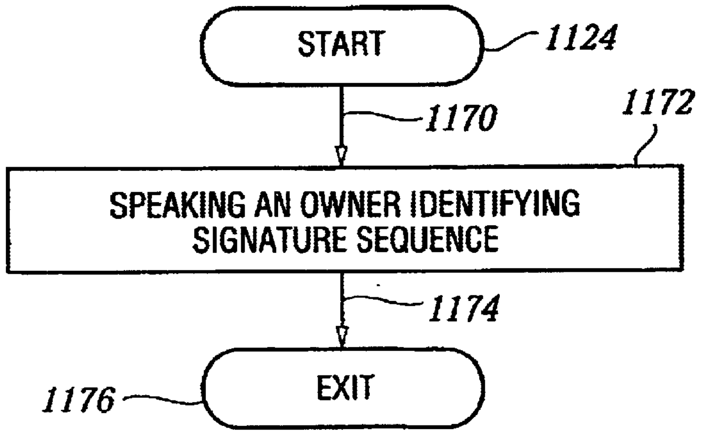
FIG. 11 depicts a detail flowchart of operation 1124 of FIG. 9 identifying said vehicle owner in accordance to certain embodiments.

FIG. 11 depicts a detail flowchart of operation 1124 of FIG. 9 identifying said vehicle owner in accordance to certain embodiments. Arrow 1170 directs the use from starting operation 1124 to operation 1172. Operation 1172 performs speaking an owner identifying signature sequence. Arrow 1174 directs the usage from operation 1172 to operation 1176. Operation 1176 terminates the operations of this flowchart.

Note that in certain embodiments, operation 1172 may be performed only once during a radio program session. In certain further embodiments, such a radio program session may be terminated if there is no user response within a predetermined time interval.

Figure 12:
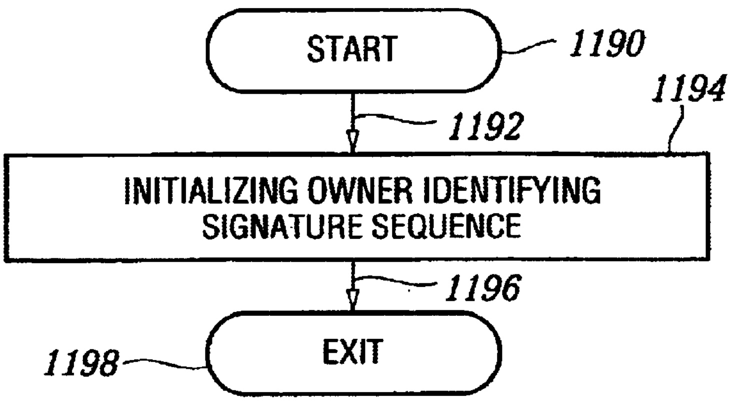
FIG. 12 depicts a flowchart of additional operation 1190 of initializing the owner identifying signature sequence to operation 1120 of FIG. 9 in accordance to certain embodiments.

FIG. 12 depicts a flowchart of additional operation 1190 of initializing the owner identifying signature sequence to operation 1120 of FIG. 9 in accordance to certain embodiments. Operation 1190 starts the operations of this flowchart. Arrow 1192 directs the use from operation 1190 to operation 1194. Operation 1194 performs initializing the owner identifying signature sequence. Arrow 1196 directs the usage from operation 1194 to operation 1198. Operation 1198 terminates the operations of this flowchart.

Note that in certain embodiments, operation 1190 may be performed once upon purchasing the device being used. In certain further embodiments, more than one owner identifying signature sequence may be initialized. In certain alternative embodiments, operation 1190 may be performed after purchasing the device being used.

Figure 13:
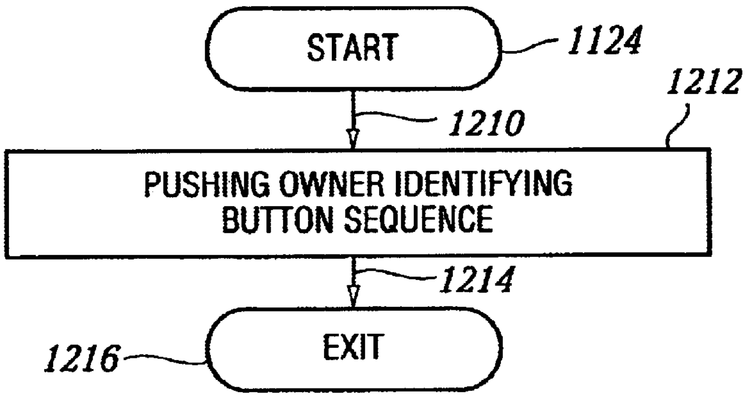
FIG. 13 depicts a detail flowchart of operation 1124 of FIG. 9 identifying said vehicle owner in accordance to certain embodiments.

FIG. 13 depicts a detail flowchart of operation 1124 of FIG. 9 identifying said vehicle owner in accordance to certain embodiments. Arrow 1210 directs the use from starting operation 1124 to operation 1212. Operation 1212 performs pushing an owner identifying button sequence. Arrow 1214 directs the usage from operation 1212 to operation 1216. Operation 1216 terminates the operations of this flowchart.

Note that in certain embodiments, operation 1212 may be performed only once during a radio program session. In certain further embodiments, such a radio program session may be terminated if there is no user response within a predetermined time interval.

Figure 14:
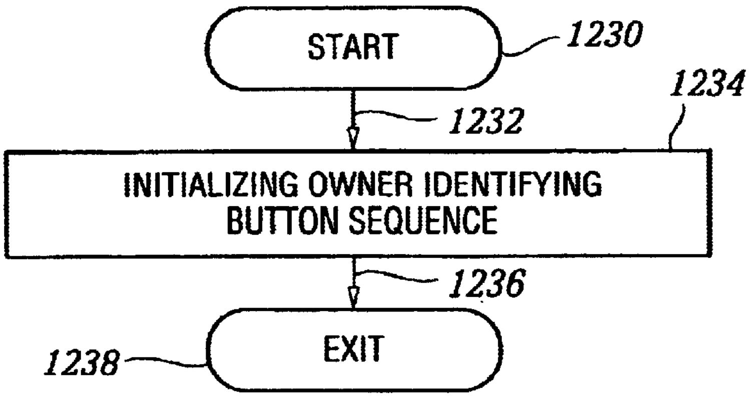
FIG. 14 depicts a flowchart of additional operation 1190 of initializing the owner identifying button sequence to operation 1120 of FIG. 9 in accordance to certain embodiments.

FIG. 14 depicts a flowchart of additional operation 1190 of initializing the owner identifying button sequence to operation 1120 of FIG. 9 in accordance to certain embodiments. Operation 1230 starts the operations of this flowchart. Arrow 1232 directs the use from operation 1230 to operation 1234. Operation 1234 performs initializing the owner identifying button sequence. Arrow 1236 directs the usage from operation 1234 to operation 1238. Operation 1238 terminates the operations of this flowchart.

Note that in certain embodiments, operation 1230 may be performed once upon purchasing the device being used. In certain further embodiments, more than one owner identifying button sequence may be initialized. In certain alternative embodiments, operation 1230 may be performed after purchasing the device being used.

Figure 15:
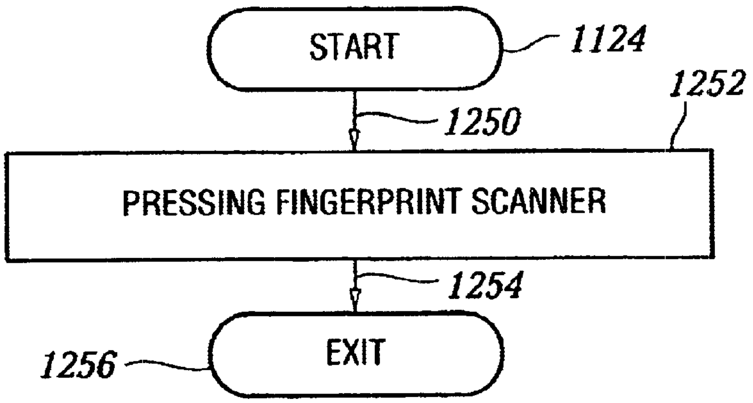
FIG. 15 depicts a detail flowchart of operation 1124 of FIG. 9 identifying said vehicle owner in accordance to certain embodiments.

FIG. 15 depicts a detail flowchart of operation 1124 of FIG. 9 identifying said vehicle owner in accordance to certain embodiments. Arrow 1250 directs the use from starting operation 1124 to operation 1252. Operation 1252 performs pressing a fingerprint scanner. Arrow 1254 directs the usage from operation 1252 to operation 1256. Operation 1256 terminates the operations of this flowchart.

Note that in certain embodiments, operation 1252 may be performed only once during a radio program session. In certain further embodiments, such a radio program session may be terminated if there is no user response within a predetermined time interval.

Figure 16:
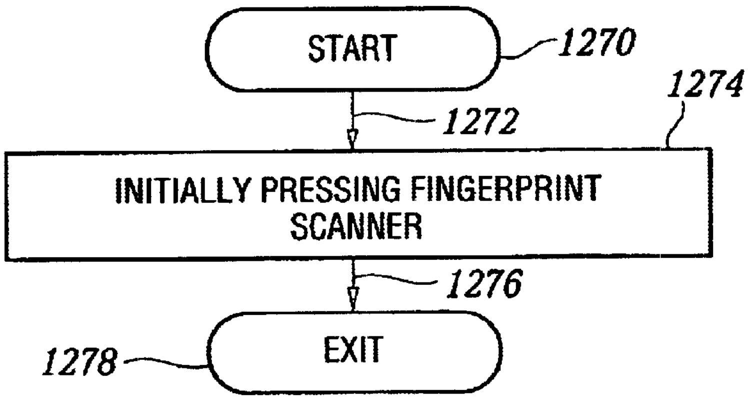
FIG. 16 depicts a flowchart of additional operation 1270 of initially pressing the fingerprint scanner to operation 1120 of FIG. 9 in accordance to certain embodiments.

FIG. 16 depicts a flowchart of additional operation 1270 of initially pressing the fingerprint scanner to operation 1120 of FIG. 9 in accordance to certain embodiments. Operation 1270 starts the operations of this flowchart. Arrow 1272 directs the use from operation 1270 to operation 1274. Operation 1274 performs initially pressing the fingerprint scanner. Arrow 1276 directs the usage from operation 1274 to operation 1278. Operation 1278 terminates the operations of this flowchart.

Note that in certain embodiments, operation 1274 may be performed once upon purchasing the device being used. In certain further embodiments, more than one owner fingerprint scan may be initialized. In certain alternative embodiments, operation 1274 may be performed after purchasing the device being used.

Figure 17:
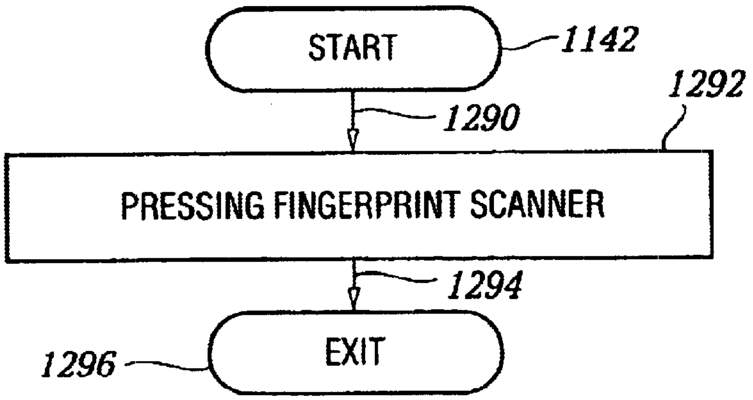
FIG. 17 depicts a detail flowchart of operation 1142 of ordering the radio program selection FIG. 10 in accordance to certain embodiments.

FIG. 17 depicts a detail flowchart of operation 1142 of ordering the radio program selection FIG. 10 in accordance to certain embodiments. Arrow 1290 directs the use from starting operation 1142 to operation 1292. Operation 1292 performs pressing the fingerprint scanner. Arrow 1294 directs the usage from operation 1292 to operation 1296. Operation 1296 terminates the operations of this flowchart.

Figure 18:
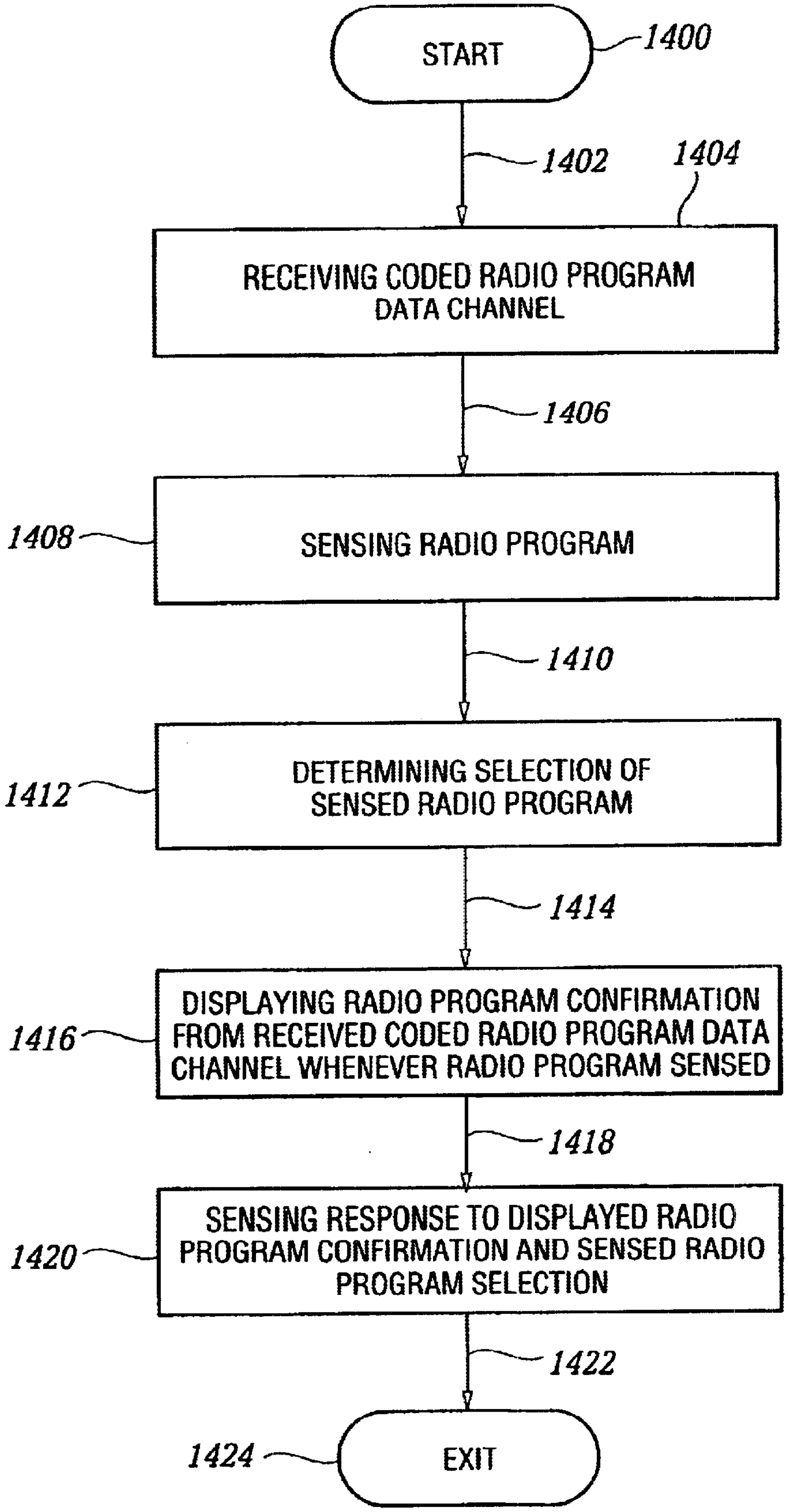
FIG. 18 depicts a flowchart controlling a vehicular radio-based program selection and ordering system.

FIG. 18 depicts a flowchart controlling a vehicular radio-based program selection and ordering system. Operation 1400 starts the operations of this flowchart. Arrow 1402 directs the flow of execution from operation 1400 to operation 1404. Operation 1404 performs receiving a coded radio program data channel. Arrow 1406 directs execution from operation 1404 to operation 1408. Operation 1408 performs sensing a radio program. Arrow 1410 directs execution from operation 1408 to operation 1412. Operation 1412 performs determining selection of said sensed radio program. Arrow 1414 directs execution from operation 1412 to operation 1416. Operation 1416 performs displaying the radio program confirmation from the received coded radio program data channel whenever the radio program is sensed. Arrow 1418 directs execution from operation 1416 to operation 1420. Operation 1420 performs sensing a response to the displayed radio program confirmation and said selection of said sensed radio program. Arrow 1422 directs execution from operation 1420 to operation 1424. Operation 1424 terminates the operations of this flowchart.

Figure 19:
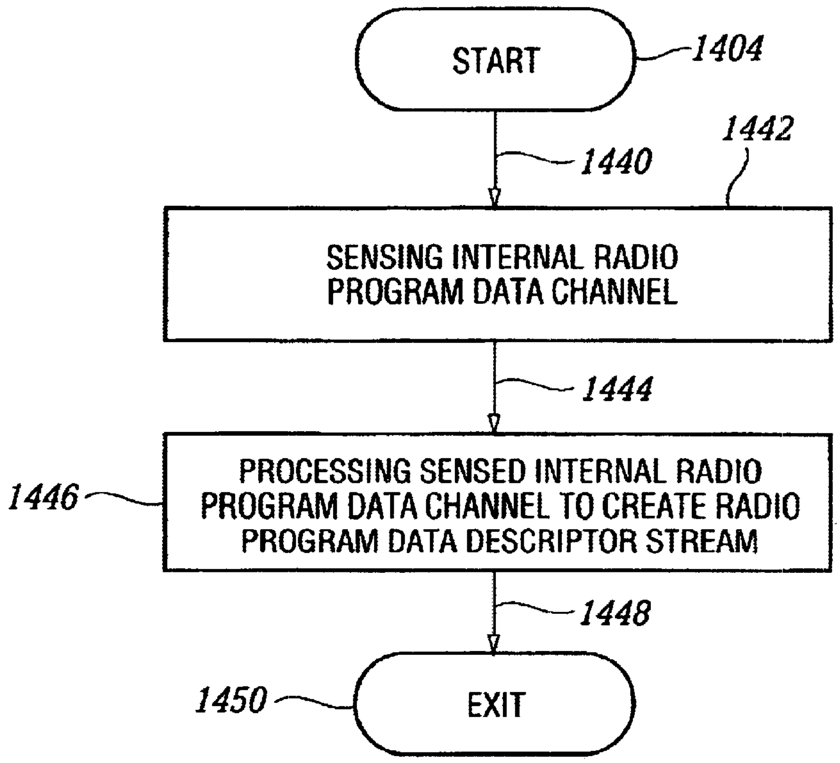
FIG. 19 depicts a detail flowchart of operation 1404 of FIG. 18 receiving a coded radio program data channel in accordance to certain embodiments.

FIG. 19 depicts a detail flowchart of operation 1404 of FIG. 18 receiving a coded radio program data channel in accordance to certain embodiments. Arrow 1440 directs the flow of execution from starting operation 1404 to operation 1442. Operation 1442 performs sensing an internal radio program data channel. Arrow 1444 directs execution from operation 1442 to operation 1446. Operation 1446 performs processing the sensed internal radio program data channel to create a radio program data descriptor stream. Arrow 1448 directs execution from operation 1446 to operation 1450. Operation 1450 terminates the operations of this flowchart.

Figure 20:
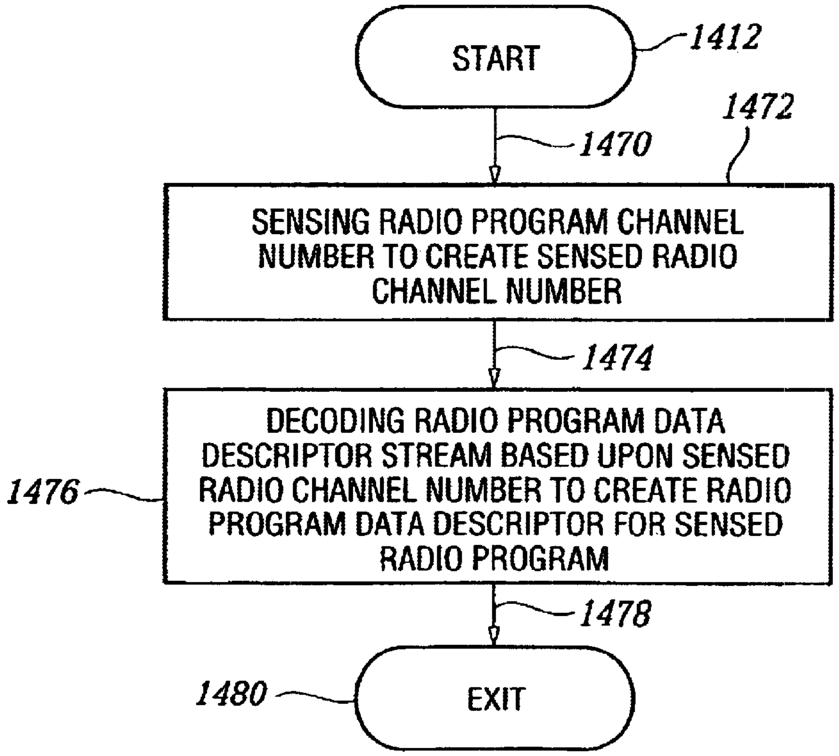
FIG. 20 depicts a detail flowchart of operation 1412 of FIG. 18 sensing the radio program in accordance to certain embodiments.

FIG. 20 depicts a detail flowchart of operation 1412 of FIG. 18 sensing the radio program in accordance to certain embodiments. Arrow 1470 directs the flow of execution from starting operation 1412 to operation 1472. Operation 1472 performs sensing a radio program channel number to create a sensed radio channel number. Arrow 1474 directs execution from operation 1472 to operation 1476. Operation 1476 performs decoding the radio program data descriptor stream based upon the sensed radio channel number to create a radio program data descriptor for the sensed radio program. Arrow 1478 directs execution from operation 1476 to operation 1480. Operation 1480 terminates the operations of this flowchart.

Figure 21:
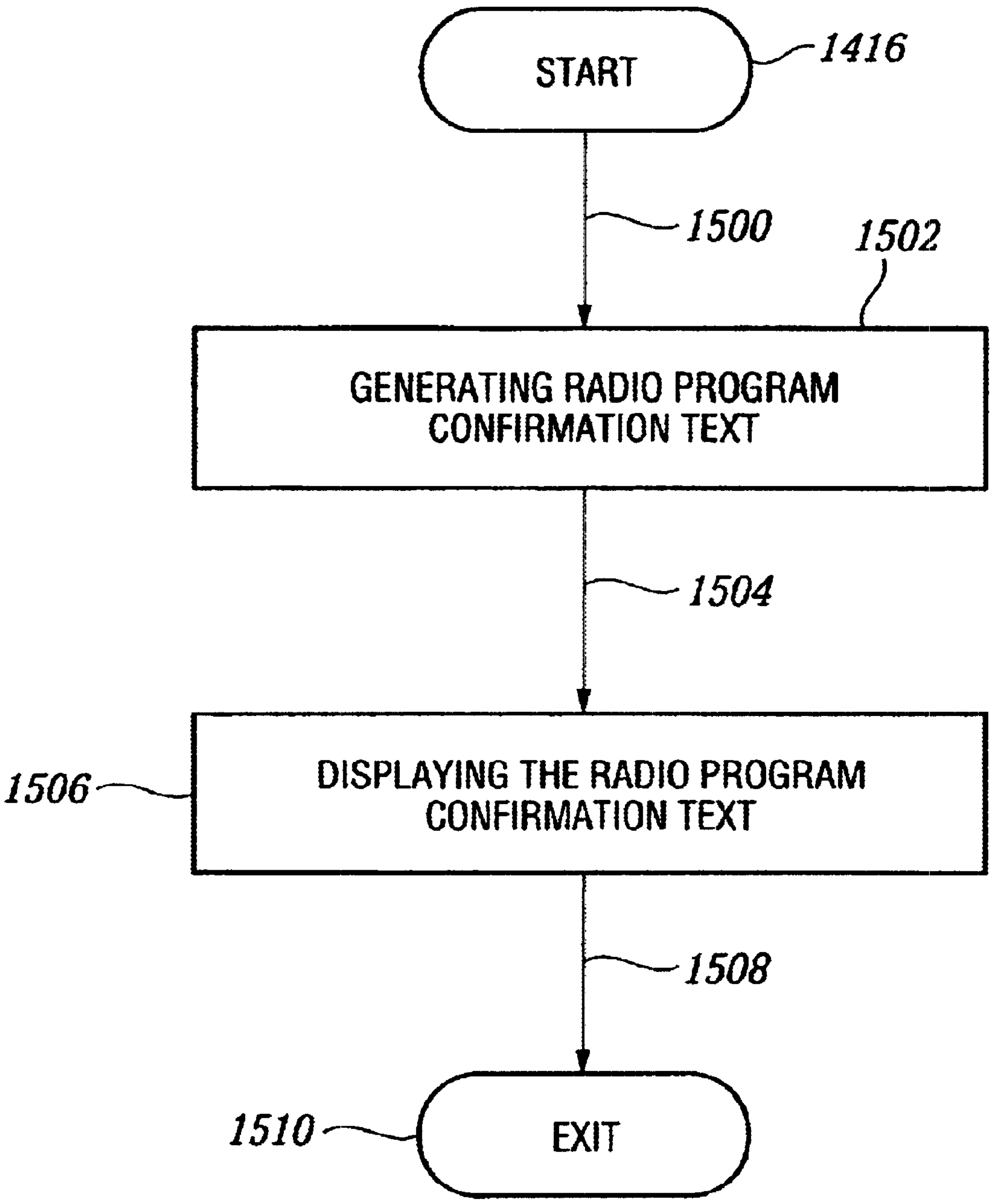
FIG. 21 depicts a,detail flowchart of operation 1416 of FIG. 18 displaying the radio program confirmation in accordance to certain embodiments.

FIG. 21 depicts a detail flowchart of operation 1416 of FIG. 18 displaying the radio program confirmation in accordance to certain embodiments. Arrow 1500 directs the flow of execution from starting operation 1416 to operation 1502. Operation 1502 performs generating a radio program confirmation text. Arrow 1504 directs execution from operation 1502 to operation 1506. Operation 1506 performs displaying the radio program confirmation text. Arrow 1508 directs execution from operation 1506 to operation 1510. Operation 1510 terminates the operations of this flowchart.

Figure 22:
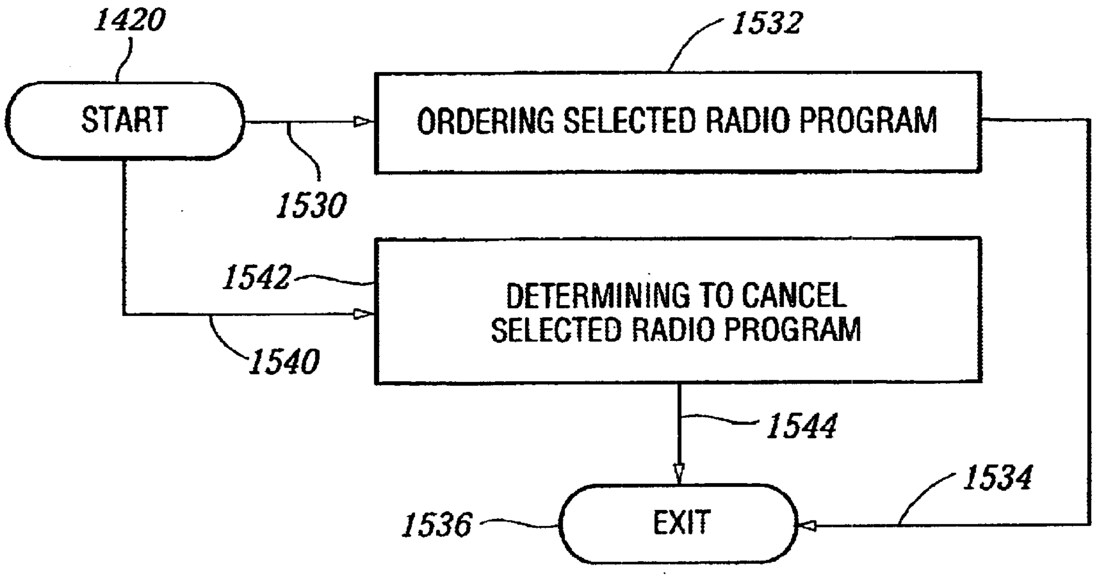
FIG. 22 depicts a detail flowchart of operation 1420 of FIG. 18 sensing the response to the displayed radio program confirmation in accordance to certain embodiments.

FIG. 22 depicts a detail flowchart of operation 1420 of FIG. 18 sensing the response to the displayed radio program confirmation in accordance to certain embodiments. Arrow 1530 directs the flow of execution from starting operation 1420 to operation 1532. Operation 1532 performs ordering the selected radio program. Arrow 1534 directs execution from operation 1532 to operation 1536. Operation 1536 terminates the operations of this flowchart.

Arrow 1540 directs the flow of execution from starting operation 1420 to operation 1542. Operation 1542 performs determining to cancel the selected radio program. Arrow 1544 directs execution from operation 1542 to operation 1536. Operation 1536 terminates the operations of this flowchart.

Figure 23:
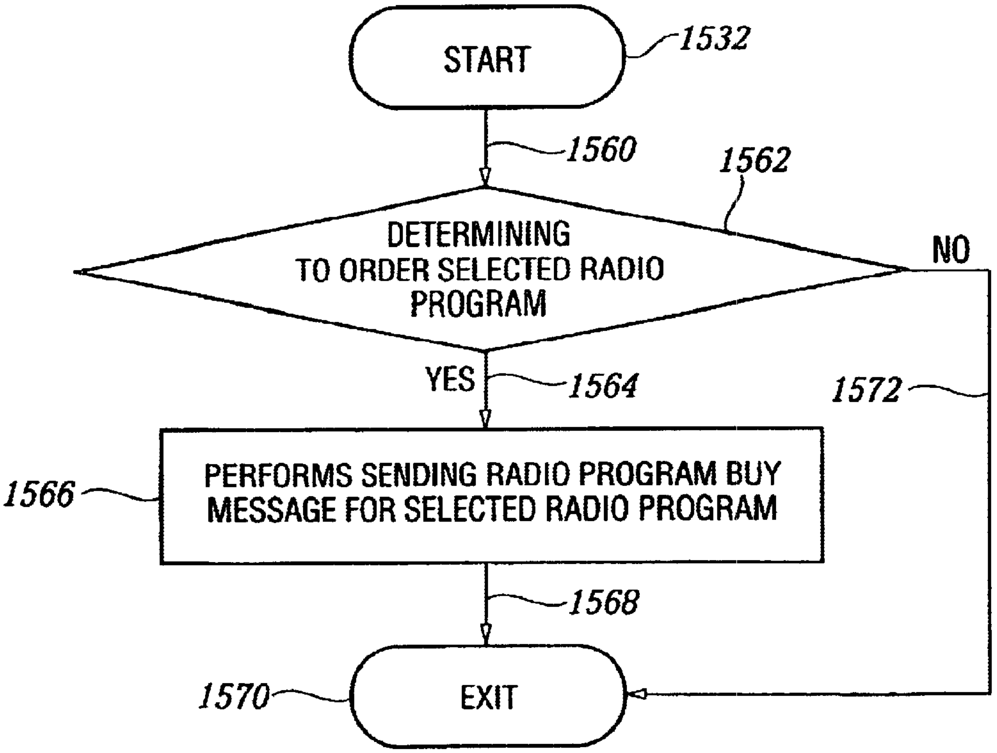
FIG. 23 depicts a detail flowchart of operation 1532 of FIG. 22 ordering the radio program in accordance to certain embodiments.

FIG. 23 depicts a detail flowchart of operation 1532 of FIG. 22 ordering the radio program in accordance to certain embodiments. Arrow 1560 directs the flow of execution from starting operation 1532 to operation 1562. Operation 1562 performs determining to order the selected radio program. Arrow 1564 directs execution from operation 1562 to operation 1566, whenever operation 1562 is asserted (Yes). Operation 1566 performs sending a radio program buy message for the selected radio program. Arrow 1568 directs execution from operation 1566 to operation 1570. Operation 1570 terminates the operations of this flowchart. Arrow 1572 directs execution from operation 1562 to operation 1570, whenever operation 1562 is not asserted (No).

Figure 24:
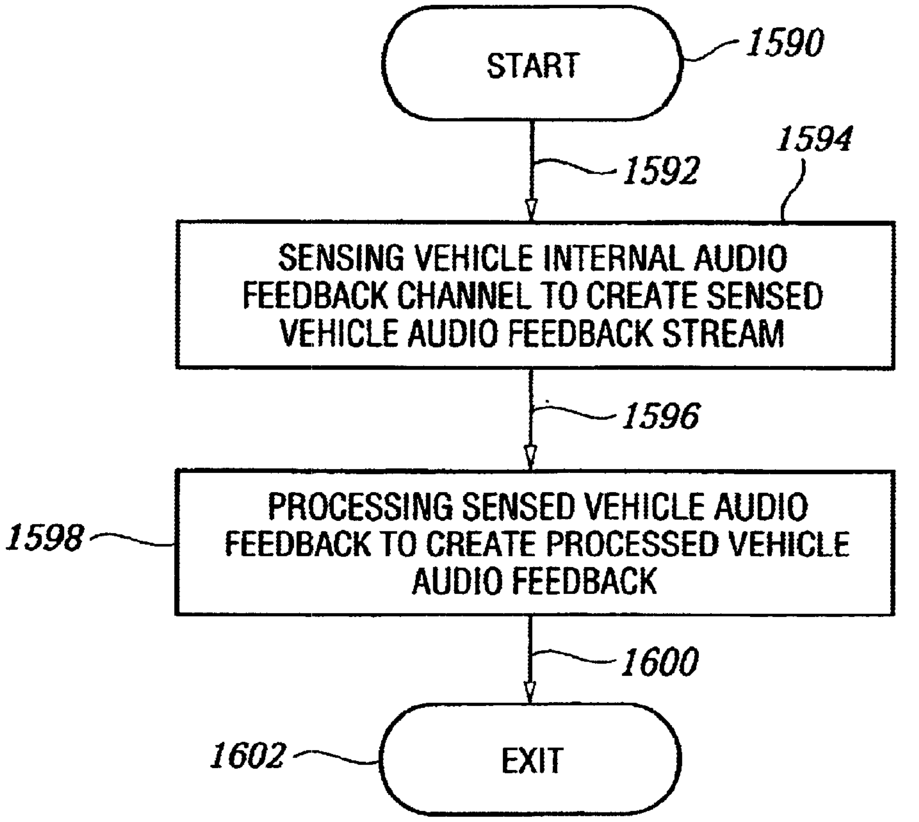
FIG. 24 depicts another flowchart of operations controlling a vehicular radio-based program selection and ordering system in accordance with certain embodiments.

FIG. 24 depicts another flowchart of operations controlling a vehicular radio-based program selection and ordering system in accordance with certain embodiments. Operation 1590 starts the operations of this flowchart. Arrow 1592 directs the flow of execution from operation 1590 to operation 1594. Operation 1594 performs sensing a vehicle internal audio feedback channel to create a sensed vehicle audio feedback stream. Arrow 1596 directs execution from operation 1594 to operation 1598. Operation 1598 performs processing the sensed vehicle audio feedback to create a processed vehicle audio feedback. Arrow 1500 directs execution from operation 1598 to operation 1502. Operation 1502 terminates the operations of this flowchart.

Figure 25:
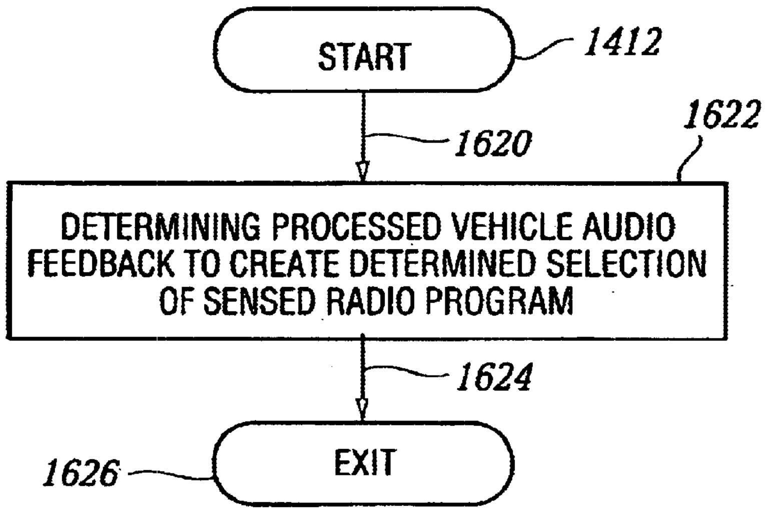
FIG. 25 depicts a detail flowchart of operation 1412 of FIG. 18 determining selection of the sensed radio program in accordance to certain embodiments.

FIG. 25 depicts a detail flowchart of operation 1412 of FIG. 18 determining selection of the sensed radio program in accordance to certain embodiments. Arrow 1620 directs the flow of execution from starting operation 1412 to operation 1622. Operation 1622 performs determining the processed vehicle audio feedback to create the determined selection of the sensed radio program. Arrow 1624 directs execution from operation 1622 to operation 1626. Operation 1626 terminates the operations of this flowchart.

Figure 26:
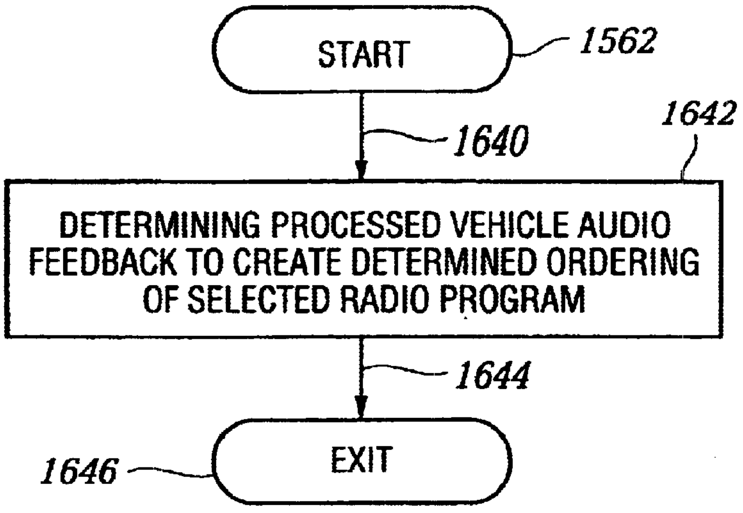
FIG. 26 depicts a detail flowchart of operation 1562 of FIG. 22 determining to order the selected radio program in accordance to certain embodiments.

FIG. 26 depicts a detail flowchart of operation 1562 of FIG. 22 determining to order the selected radio program in accordance to certain embodiments. Arrow 1640 directs the flow of execution from starting operation 1562 to operation 1642. Operation 1642 performs determining the processed vehicle audio feedback to create the determined ordering of the selected radio program. Arrow 1644 directs execution from operation 1642 to operation 1646. Operation 1646 terminates the operations of this flowchart.

Figure 27:
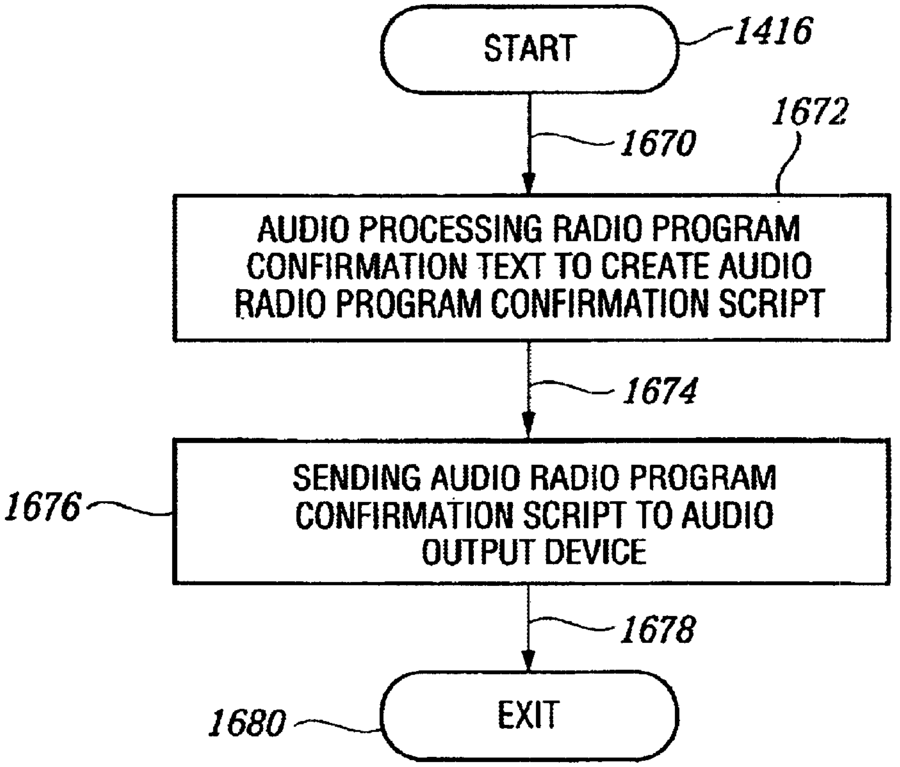
FIG. 27 depicts a detail flowchart of operation 1416 of FIG. 18 displaying the radio program confirmation text in accordance to certain embodiments.

FIG. 27 depicts a detail flowchart of operation 1416 of FIG. 18 displaying the radio program confirmation text in accordance to certain embodiments. Arrow 1670 directs the flow of execution from starting operation 1416 to operation 1672. Operation 1672 performs audio processing the radio program confirmation text to create an audio radio program confirmation script. Arrow 1674 directs execution from operation 1672 to operation 1676. Operation 1676 performs sending the audio radio program confirmation script to an audio output device. Arrow 1678 directs execution from operation 1676 to operation 1680. Operation 1680 terminates the operations of this flowchart.

Figure 28:
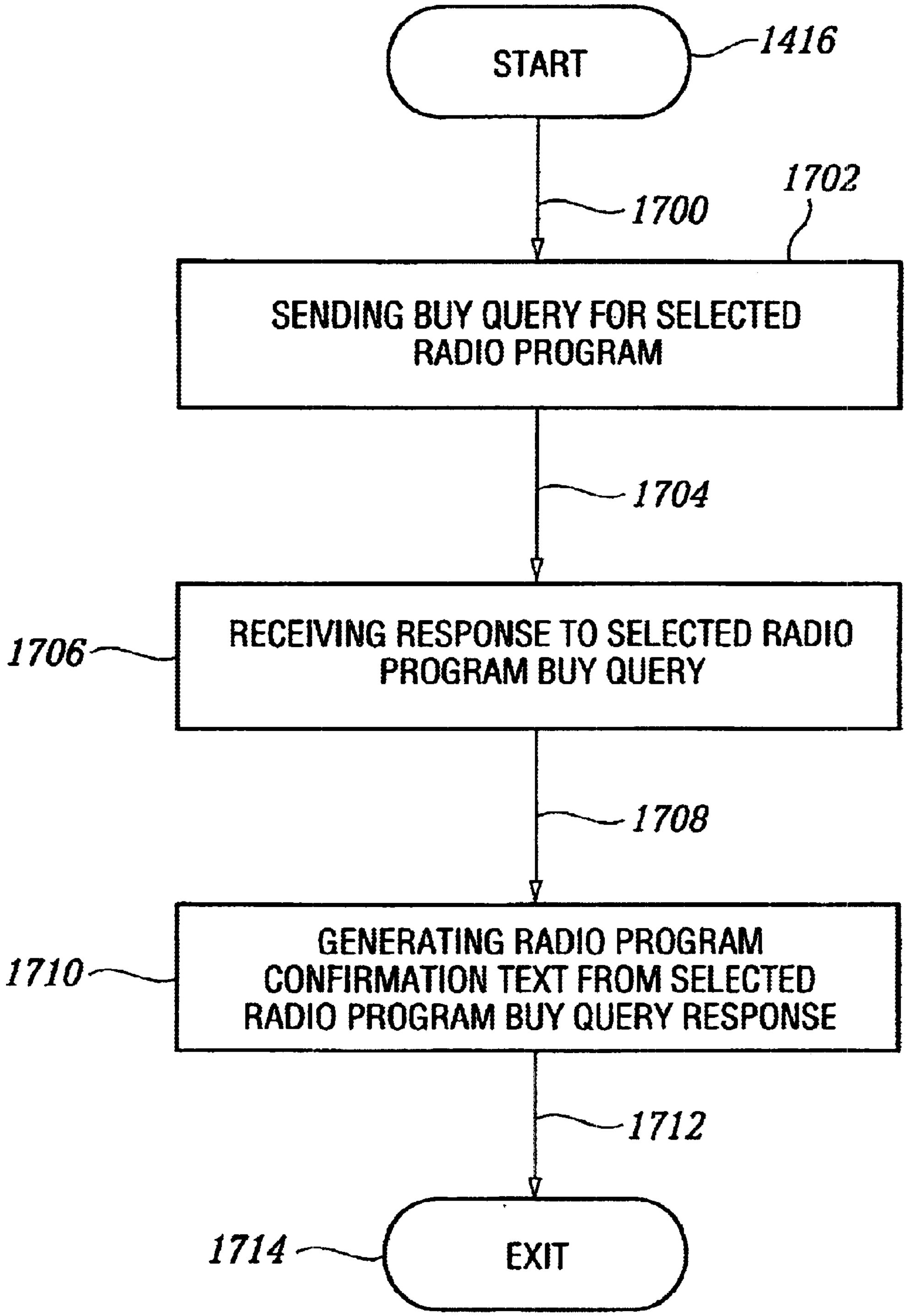
FIG. 28 depicts a detail flowchart of operation 1416 of FIG. 18 displaying the radio program confirmation text in accordance to certain embodiments.

FIG. 28 depicts a detail flowchart of operation 1416 of FIG. 18 displaying the radio program confirmation text in accordance to certain embodiments. Arrow 1700 directs the flow of execution from starting operation 1416 to operation 1702. Operation 1702 performs sending a buy query for the selected radio program. Arrow 1704 directs execution from operation 1702 to operation 1706. Operation 1706 performs receiving a response to the selected radio program buy query. Arrow 1708 directs execution from operation 1706 to operation 1710. Operation 1710 performs generating the radio program confirmation text from the selected radio program buy query response. Arrow 1712 directs execution from operation 1710 to operation 1714. Operation 1714 terminates the operations of this flowchart.

Figure 29:
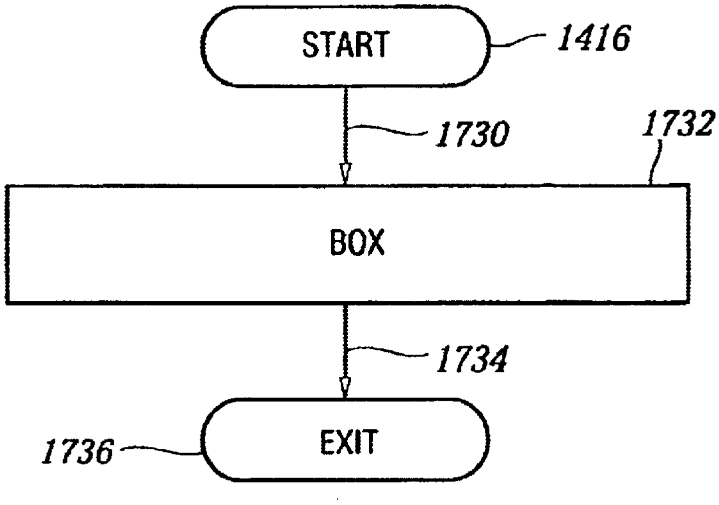
FIG. 29 depicts a detail flowchart of operation 1416 of FIG. 18 displaying the radio program confirmation text in accordance to certain embodiments.

FIG. 29 depicts a detail flowchart of operation 1416 of FIG. 18 displaying the radio program confirmation text in accordance to certain embodiments. Arrow 1730 directs the flow of execution from starting operation 1416 to operation 1732. Operation 1732 performs presenting said radio program confirmation text to a visual output device. Arrow 1734 directs execution from operation 1732 to operation 1736. Operation 1736 terminates the operations of this flowchart.

Figure 30:
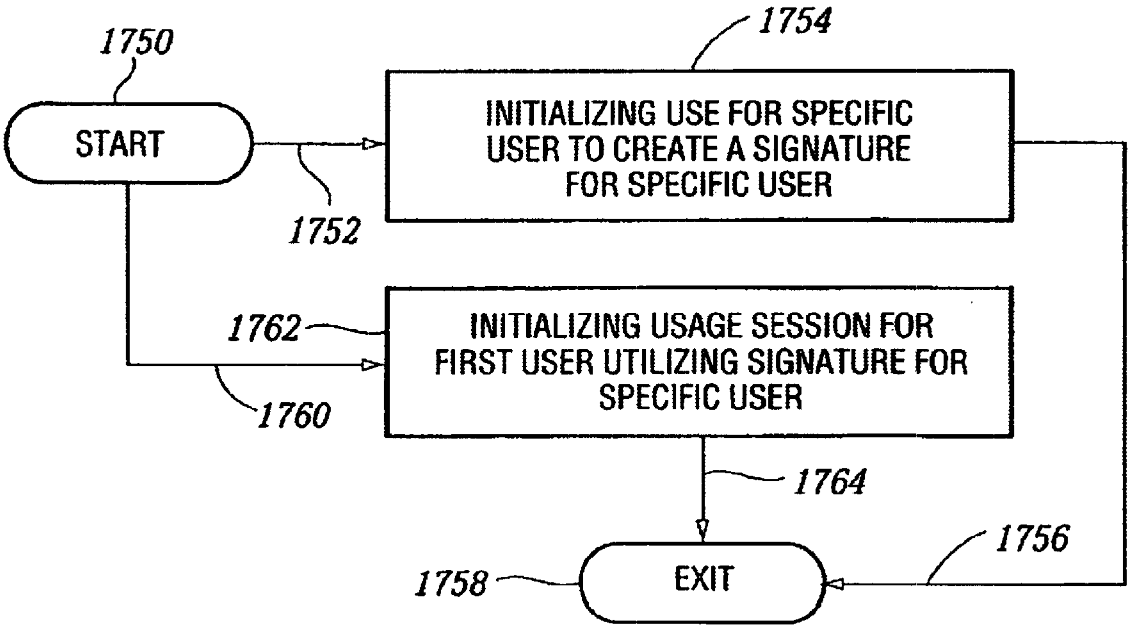
FIG. 30 depicts another flowchart of operations controlling a vehicular radio-based program selection and ordering system in accordance with certain embodiments.

FIG. 30 depicts another flowchart of operations controlling a vehicular radiobased program selection and ordering system in accordance with certain embodiments. Operation 1750 starts the operations of this flowchart. Arrow 1752 directs the flow of execution from operation 1750 to operation 1754. Operation 1754 performs initializing use for a specific user to create a signature for the specific user. Arrow 1756 directs execution from operation 1754 to operation 1758. Operation 1758 terminates the operations of this flowchart. Arrow 1760 directs the flow of execution from starting operation 1750 to operation 1762. Operation 1762 performs initializing a usage session for a first user utilizing the signature for the specific user. Arrow 1764 directs execution from operation 1762 to operation 1758. Operation 1758 terminates the operations of this flowchart.

Note that operations 1754 and 1762 may be selected through a number of different mechanisms, including but not limited to pushing buttons.

Figure 31:
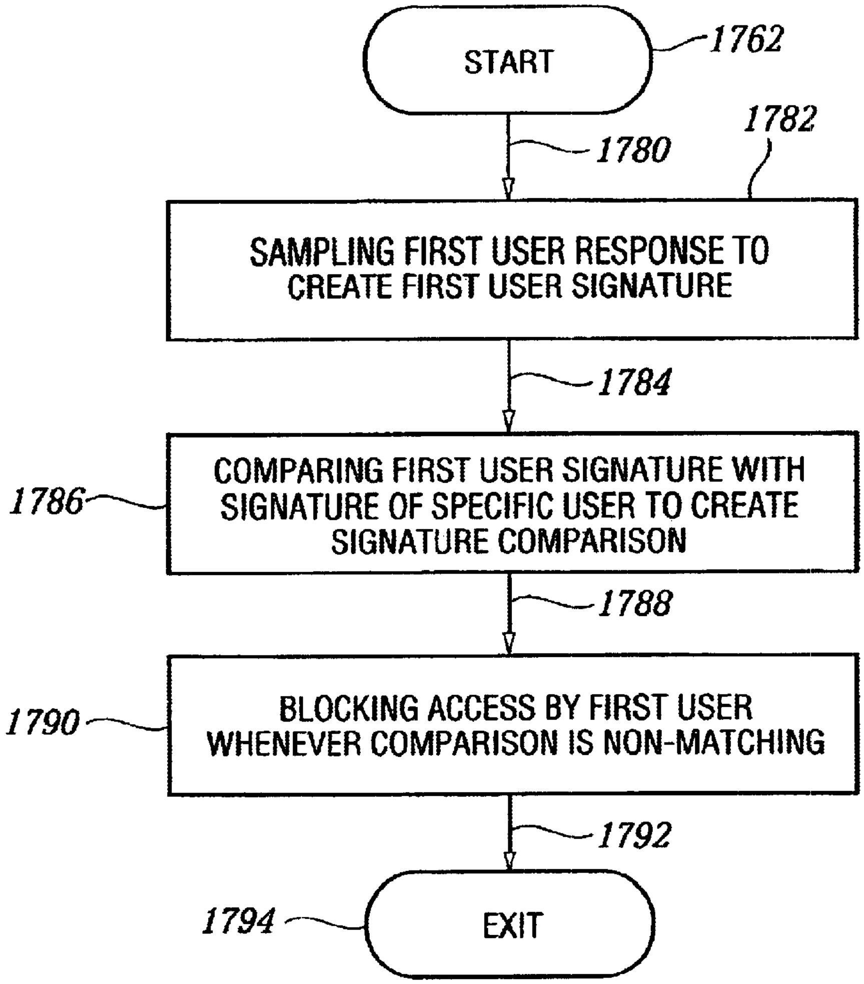
FIG. 31 depicts a detail flowchart of operation 1762 of FIG. 30 initializing a usage session for a first user utilizing the signature for the specific user in accordance to certain embodiments.

FIG. 31 depicts a detail flowchart of operation 1762 of FIG. 30 initializing a usage session for a first user utilizing the signature for the specific user in accordance to certain embodiments. Operation 1780 starts the operations of this flowchart. Arrow 1782 directs the flow of execution from operation 1780 to operation 1784. Operation 1784 performs sampling the first user response to create a first user signature. Arrow 1786 directs execution from operation 1784 to operation 1788. Operation 1788 performs comparing the first user signature with the signature of the specific user to create a signature comparison. Arrow 1790 directs execution from operation 1788 to operation 1792. Operation 1792 performs blocking access by the first user whenever the comparison is non-matching. Arrow 1794 directs execution from operation 1792 to operation 1796. Operation 1796 terminates the operations of this flowchart.

Figure 32:
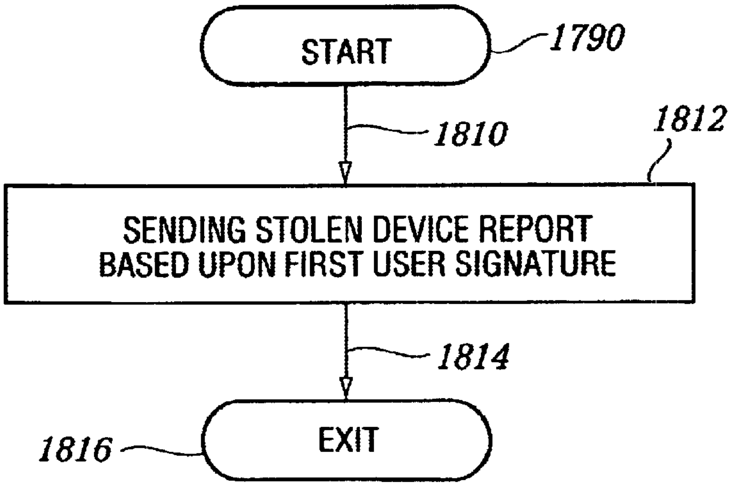
FIG. 32 depicts a detail flowchart of operation 1790 of FIG. 31 blocking access by the first user whenever the comparison is non-matching in accordance to certain embodiments.

FIG. 32 depicts a detail flowchart of operation 1790 of FIG. 31 blocking access by the first user whenever the comparison is non-matching in accordance to certain embodiments. Arrow 1810 directs the flow of execution from starting operation 1790 to operation 1812. Operation 1812 performs sending a stolen device report based upon the first user signature. Arrow 1814 directs execution from operation 1812 to operation 1816. Operation 1816 terminates the operations of this flowchart.

Figure 33:
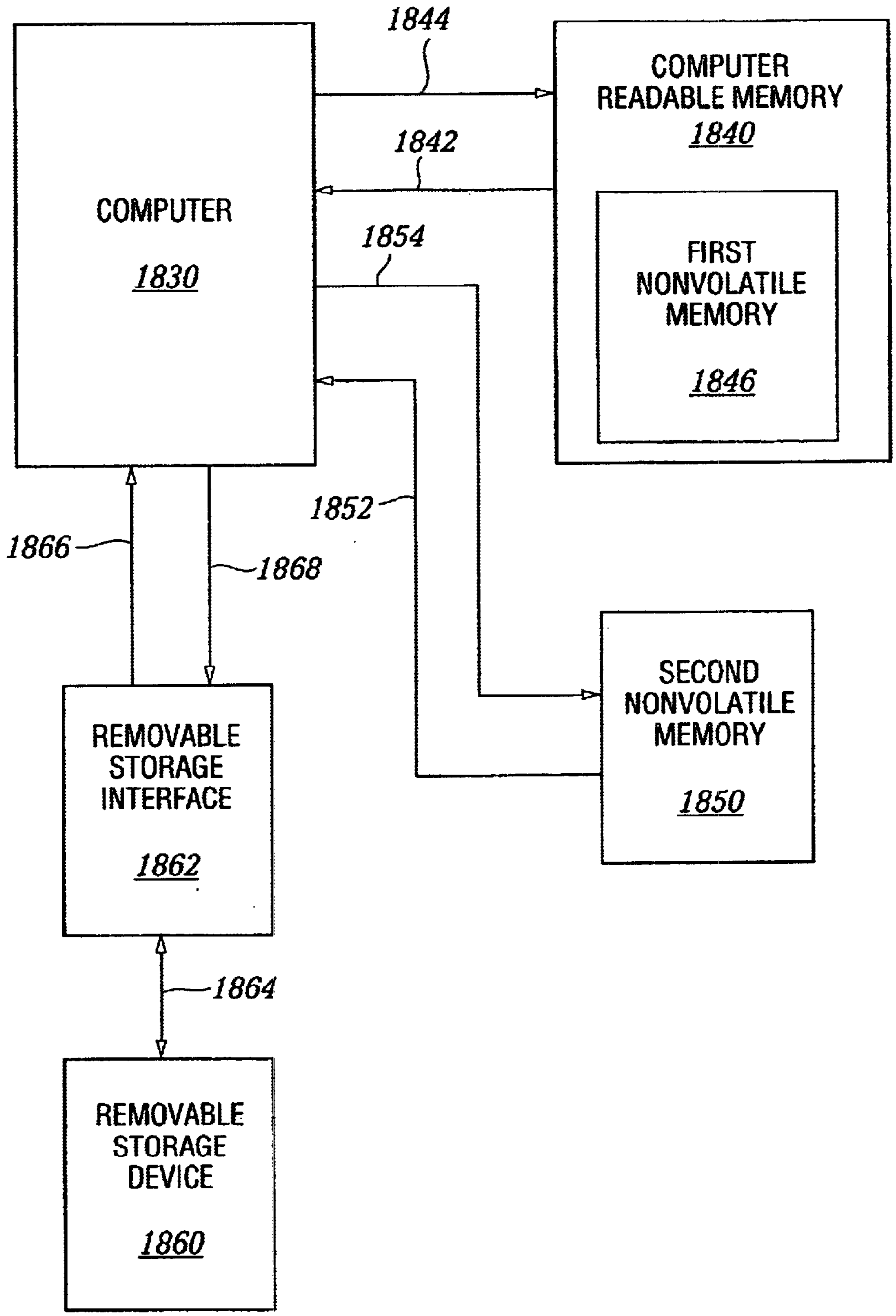
FIG. 33 depicts a high level system block diagram showing a computer with several forms of memory which in different embodiments provide residence for programs implementing the disclosed and claimed methods of controlling a vehicular radio.

FIG. 33 depicts a high level system block diagram showing a computer with several forms of memory which in different embodiments provide residence for programs implementing the disclosed and claimed methods of controlling a vehicular radio. Computer 1830 is coupled to Computer Readable Memory 1840 by read access operations as indicated by arrow 1842. At least one program implementing the method according to the present invention of controlling a vehicular radio may reside in this memory 1842 in accordance with certain embodiments. In certain further embodiments, at least one program implementing the method according to the present invention may reside in a first non-volatile memory 1846, contained within the memory domain of computer readable memory 1840. Some or all of this first non-volatile memory 1846, as well as some or all of the computer readable memory 1840 may be successfully accessed by write operations as indicated by the arrow 1844 from computer 1830. Certain preferred embodiments of the above memory system include but are not limited to RAM, battery backed up RAM, nonvolatile semiconductor memory, combinations of RAM and nonvolatile semiconductor memory, as well as RAM and disk memory of various kinds. Nonvolatile memory includes but is not limited to one or more devices embodying ROM, EPROM, EEPROM or Flash EEPROM memory technology as well as disk memory including both electromagnetic and optical recording media.

The coupling access operations 1842 and 1844 may be carried out using a variety of mechanisms including but not limited to computer busses and addressable port communication schemes. Computer busses include but are not limited to multiplexed address and data busses, demultiplexed address and data busses, as well as encoded multiplexed address data busses. Multiplexed computer busses share bus resources for the address and data signals so that most operations involve separate bus states to transfer address and data signals. A number of solid-state disk busses are examples of multiplexed address and data bus. Demultiplexed address and data busses do not share bus resources for the address and data signals allowing for address and data signals to be transferred in a single bus state. PCI bus is an example of such a demultiplexed address and data bus. Encoded multiplexed address and data buses encode these address and data signals so that several bus states are required to transfer at least some of the address or data signals. USB (Universal Serial Bus) is an example of an encoded multiplexed address and data bus.

Computer 1830 is further coupled to a second nonvolatile memory 1850 in a fashion supporting read operations as indicated by arrow 1852. This second nonvolatile memory 1850 may provide the residence of at least one program implementing the disclosed and claimed methods of controlling a vehicular radio. In certain further embodiments, the second nonvolatile memory 1850 may be written as indicated by arrow 1854 from computer 1830.

A removable storage device 1860 engaged 1864 with removable storage interface 1862, writeably coupled 1868, and readably coupled 1866 to computer 1830 provides a residence for at least one program implementing the disclosed methods of controlling a vehicular radio in accordance with certain embodiments.

Figure 34:
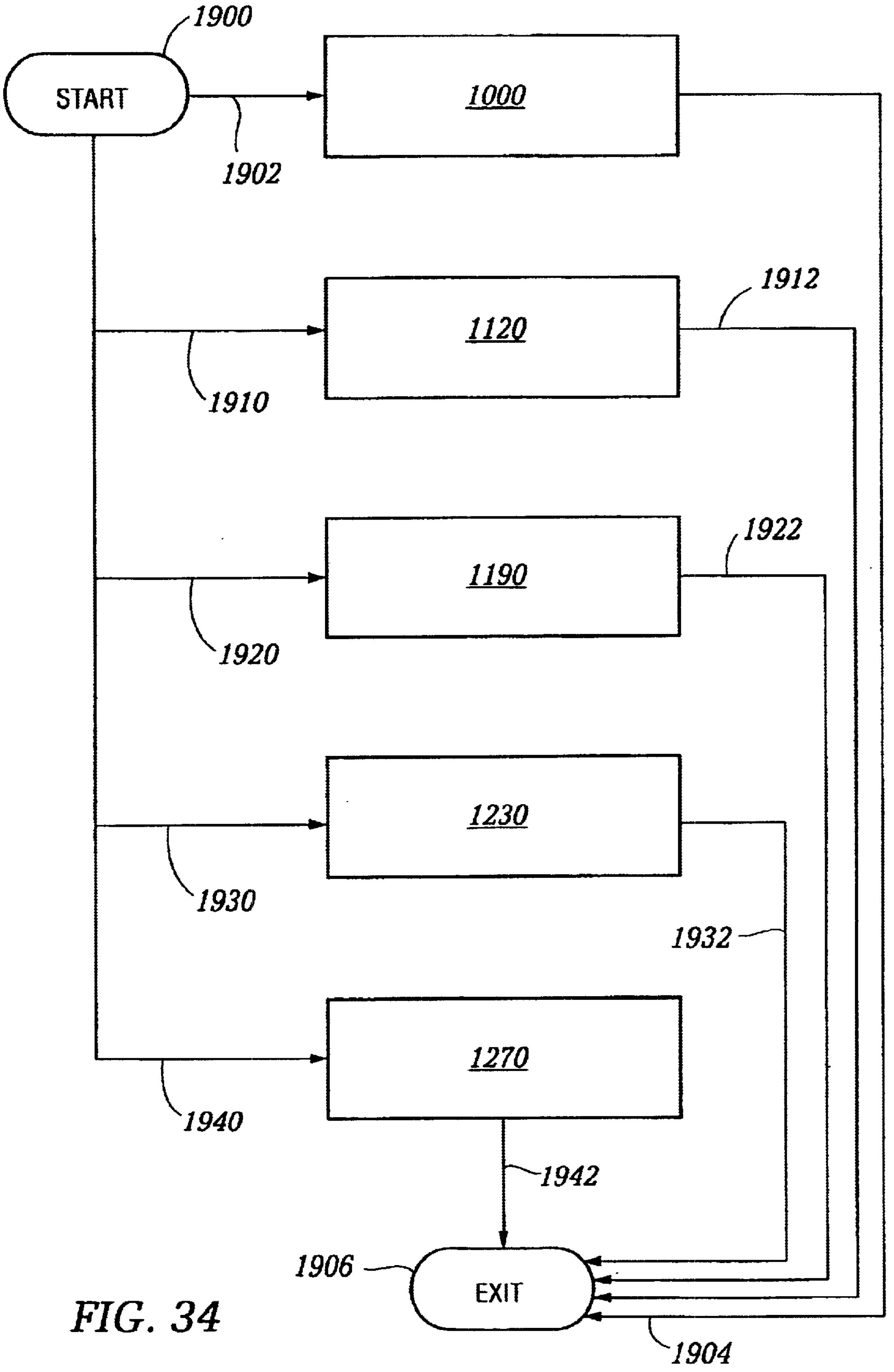
FIG. 34 depicts a summary flowchart of using a vehicular radio-based program selection and ordering system in accordance with an embodiment.

FIG. 34 depicts a summary flowchart of using a vehicular radio-based program selection and ordering system in accordance with an embodiment. Operation 1900 starts the operations of this flowchart. Arrow 1902 directs the usage from operation 1900 to operation 1000. Operation 1000 performs operations discussed with regards to FIG. 4 above. Arrow 1904 directs the usage from operation 1000 to operation 1906. Operation 1906 terminates the operations of this flowchart.

Arrow 1910 directs the usage from starting operation 1900 to operation 1120. Operation 1120 performs operations discussed regarding FIG. 9. Arrow 1912 directs the usage from operation 1120 to operation 1906. Operation 1906 terminates the operations of this flowchart.

Arrow 1920 directs the usage from starting operation 1900 to operation 1190. Operation 1190 performs operations discussed regarding FIG. 12. Arrow 1922 directs the usage from operation 1190 to operation 1906. Operation 1906 terminates the operations of this flowchart.

Arrow 1930 directs the usage from starting operation 1900 to operation 1230. Operation 1230 performs operations discussed regarding FIG. 14. Arrow 1932 directs the usage from operation 1230 to operation 1906. Operation 1906 terminates the operations of this flowchart.

Arrow 1940 directs the usage from starting operation 1900 to operation 1270. Operation 1270 performs operations discussed regarding FIG. 16. Arrow 1942 directs the usage from operation 1270 to operation 1906. Operation 1906 terminates the operations of this flowchart.

Figure 35:
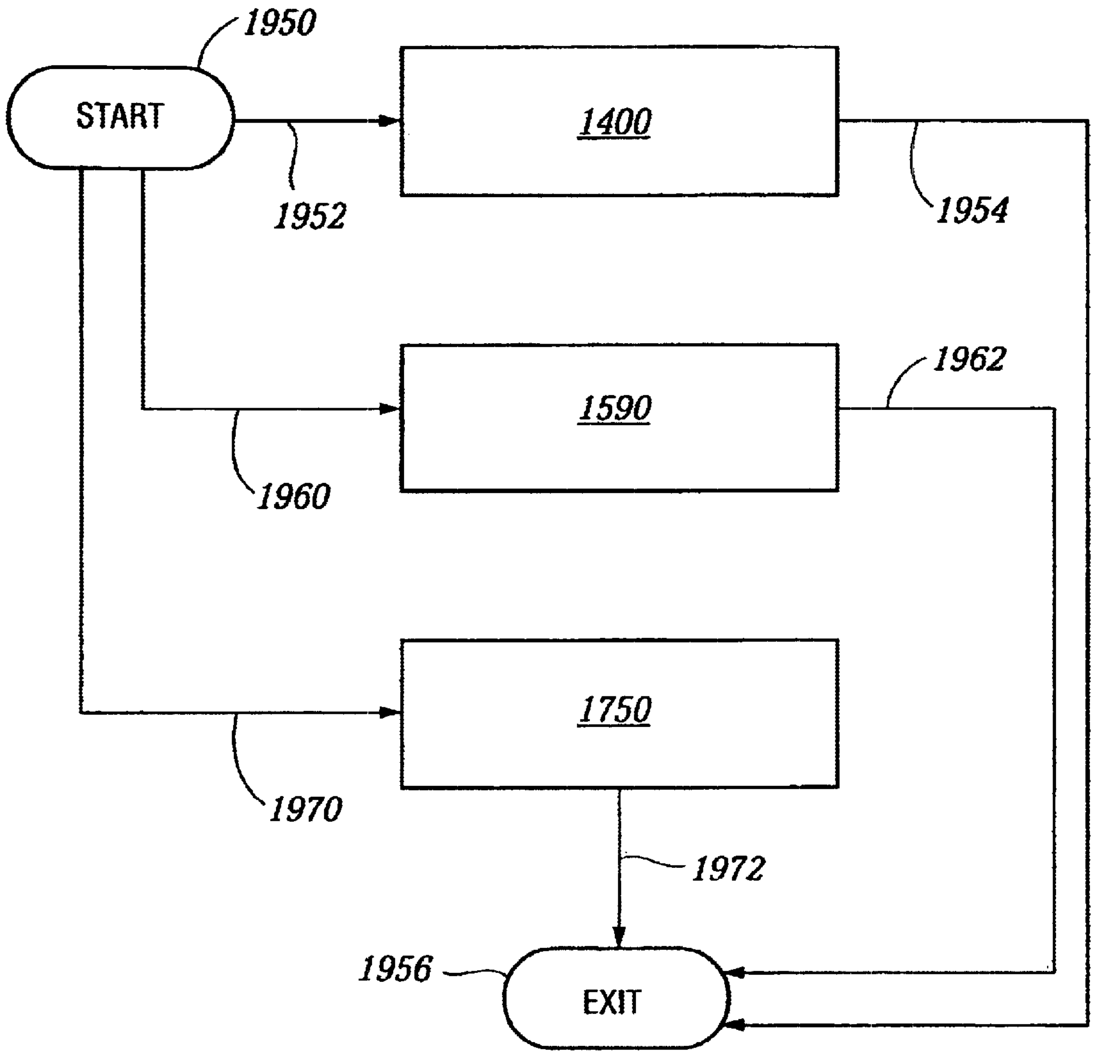
FIG. 35 depicts a summary flowchart of operations controlling a vehicular radio-based program selection and ordering system in accordance with certain embodiments.

FIG. 35 depicts a summary flowchart of operations controlling a vehicular radio-based program selection and ordering system in accordance with certain embodiments. Operation 1950 starts the operations of this flowchart. Arrow 1952 directs the flow of execution from operation 1950 to operation 1400. Operation 1400 performs operations discussed regarding FIG. 18. Arrow 1954 directs execution from operation 1400 to operation 1956. Operation 1956 terminates the operations of this flowchart.

Arrow 1960 directs the flow of execution from starting operation 1950 to operation 1590. Operation 1590 performs operations discussed regarding FIG. 24. Arrow 1962 directs execution from operation 1590 to operation 1956. Operation 1956 terminates the operations of this flowchart.

Arrow 1970 directs the flow of execution from starting operation 1950 to operation 1750. Operation 1750 performs operations discussed regarding FIG. 30. Arrow 1972 directs execution from operation 1750 to operation 1956. Operation 1956 terminates the operations of this flowchart.

Note that direction of execution to these operations may be achieved by a variety of mechanisms, including but not limited to the pushing of buttons and selection of menu options, possibly as part of an event processing mechanism within an application running on an event driven real-time operating system.

Figure 36:
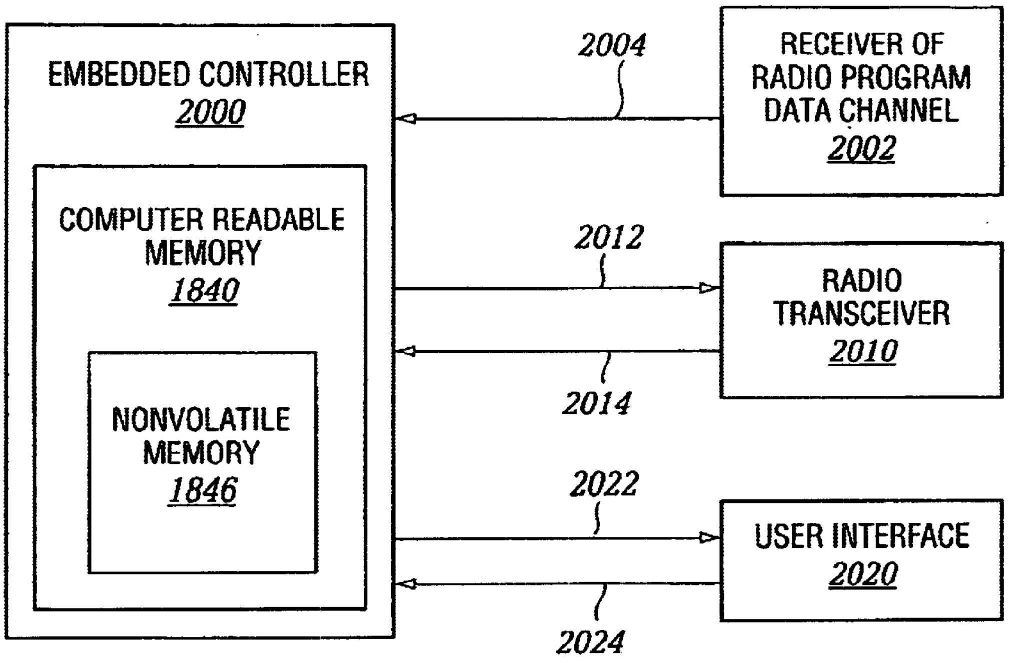
FIG. 36 depicts a system block diagram of a radio for receiving a radio program data channel, and conducting transactions in accordance with certain embodiments.

FIG. 36 depicts a system block diagram of a radio for receiving a radio program data channel, and conducting transactions in accordance with certain embodiments. An embedded controller 2000 is shown including a computer readable memory 1840 containing a writeable non-volatile memory component 1846. A receiver 2002 of said radio program data channel is coupled 2004 to the embedded controller 2000 generating a radio program data channel stream readably accessible by the embedded controller.

A radio transceiver 2010 is coupled 2012 to the embedded controller 2012 receiving from the embedded controller transaction output messages. The radio transceiver 2010 generates a transaction input stream 2014 readably accessible by the embedded controller 2000.

A user interface circuit 2020 is coupled to said embedded controller 2000 generating user selection data readably accessible 2024 by said embedded controller. The user interface circuit 2020 receives 2022 from said embedded controller 2000 user output data.

Figure 37:
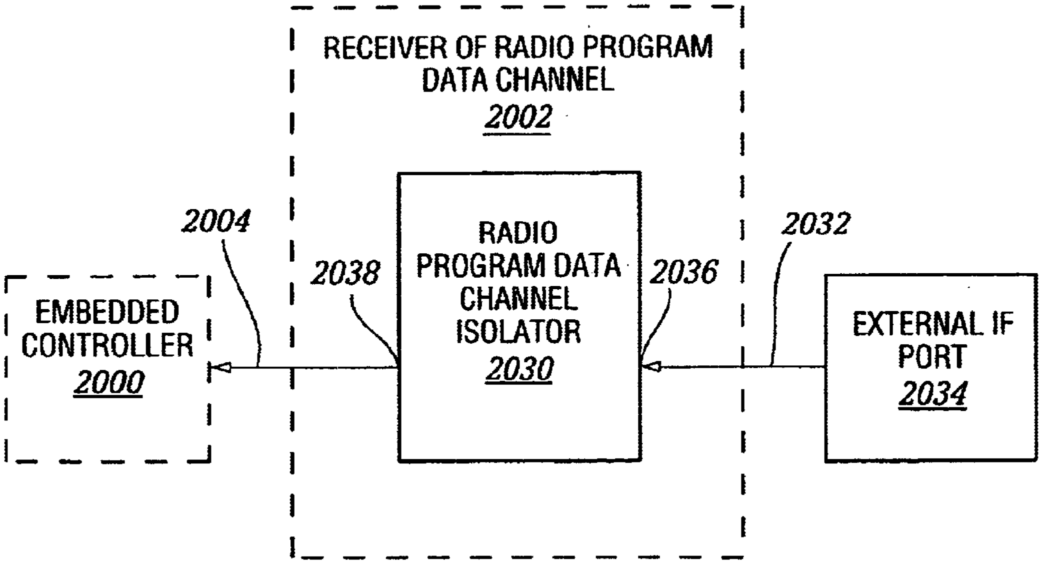
FIG. 37 depicts a detail system block diagram system block 2002, a receiver of the radio program data channel as shown in FIG. 36 in accordance with certain further embodiments.

FIG. 37 depicts a detail system block diagram system block 2002, a receiver of the radio program data channel as shown in. FIG. 36 in accordance with certain further embodiments. The radio further includes an external IF signal input port 2034. The radio program data channel receiver 2002 includes a radio program data channel isolator 2030 containing an input port 2036 coupled 2032 to said external IF input signal port 2034. The radio program data channel isolator 2030 further contains a digital output port 2038 coupled 2004 to the embedded controller 2000 providing the radio program data channel stream.

In certain embodiments the external IF signal input port 2034 may be derived from the output 110 of FM IF stage 108, as required for reception of the RDBS sub-band. In certain alternative embodiments, the external IF signal input port 2034 may be derived from a different signal protocol transmitted independently of standard FM broadcasts. Such alternative embodiments include but are not limited to other applications AM, FM, Frequency Division Multiple Access (FDMA), Time Division Multiple Access (TDMA), Wavelet Division Multiple Access, various spread spectrum techniques including but not limited to direct sequence (CDMA), Wideband CDMA employing both spreading and scrambling codes, frequency hopping and time hopping.

Figure 38:
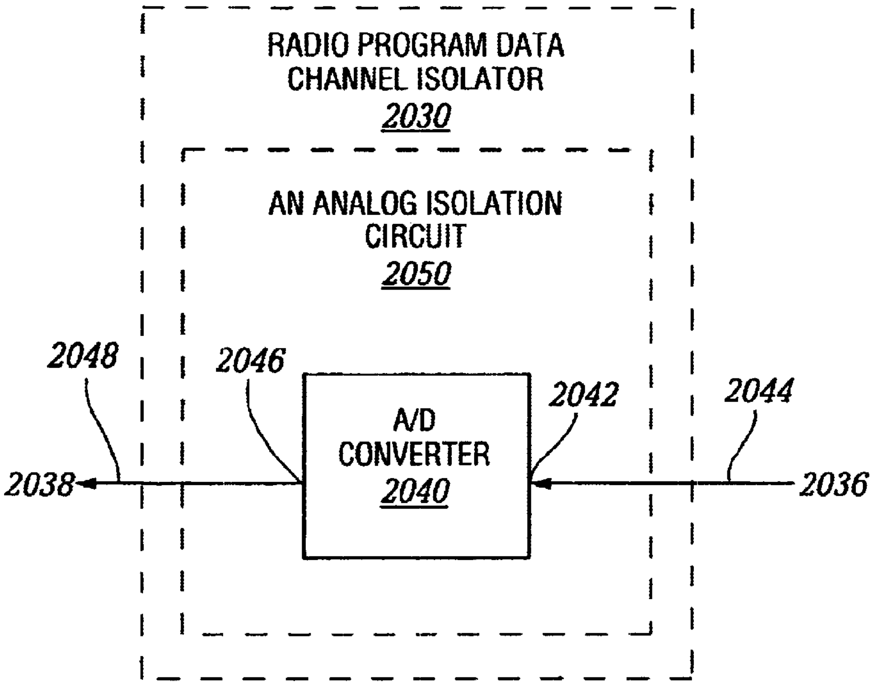
FIG. 38 depicts a detail system block diagram of radio program data channel isolator 2030 as shown in FIG. 37 in accordance with certain further embodiments wherein the external IF signal input port supports an analog signal protocol.

FIG. 38 depicts a detail system block diagram of radio program data channel isolator 2030 as shown in FIG. 37 in accordance with certain further embodiments wherein the external IF signal input port supports an analog signal protocol. The radio program data channel isolator 2032 includes an analog isolation circuit 2050. The analog isolation circuit 2050 includes a first analog input port coupled 2044 to the external IF input port 2036 and a first digital output port coupled 2048 to the radio program data channel isolator digital output. The analog isolation circuit 2050 further includes an A/D converter 2040 further comprising a second analog input port 2042 coupled 2044 to the first analog input port and a second digital output port 2046 coupled 2048 to the first digital output port.

Figure 39:
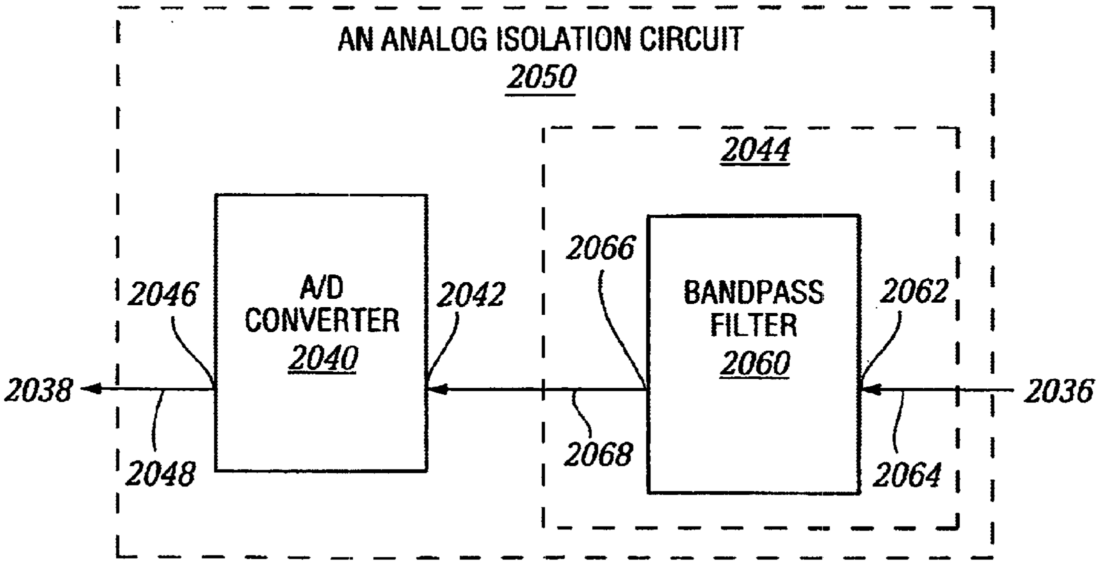
FIG. 39 depicts a detail system block diagram of analog isolation circuit 2050 as shown in FIG. 38 in accordance with certain further embodiments wherein the external IF signal input port supports an analog signal protocol.

FIG. 39 depicts a detail system block diagram of analog isolation circuit 2050 as shown in FIG. 38 in accordance with certain further embodiments wherein the external IF signal input port supports an analog signal protocol. The analog isolation circuit 2050 includes bandpass filter 2060 containing an input port 2062 coupled 2064 to the external IF input signal 2036 and further containing a output port 2066 coupled 2068 to the AND converter input port 2042.

Figure 40:
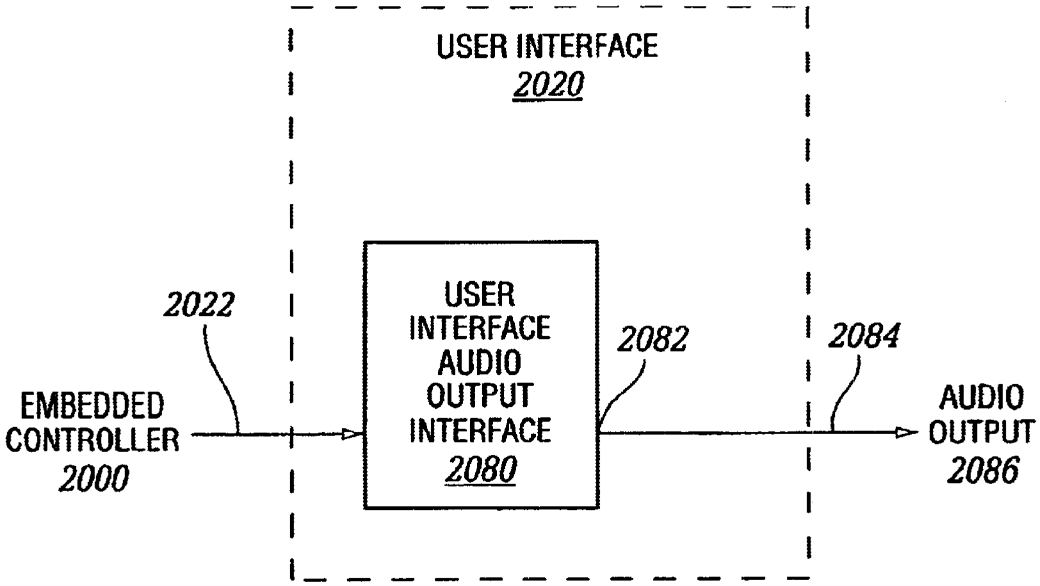
FIG. 40 depicts a detail system block diagram of user interface 2020 as shown in FIG. 36 in accordance with certain embodiments supporting a user interface audio output interface providing audio output of the user output data.

FIG. 40 depicts a detail system block diagram of user interface 2020 as shown in FIG. 36 in accordance with certain embodiments supporting a user interface audio output interface 2080 providing 2082, 2084 audio output 2086 of the user output data. Note that in certain embodiments, user interface audio output interface 2080 can provide a digital interface. In certain alternative embodiments, user interface audio output interface 2080 can provide an analog interface. In certain embodiments, user interface audio output interface 2080 can provide feed 2084 a mixer. In certain embodiments, user interface audio output interface 2080 can provide feed 2084 a multiplexer.

Figure 41:
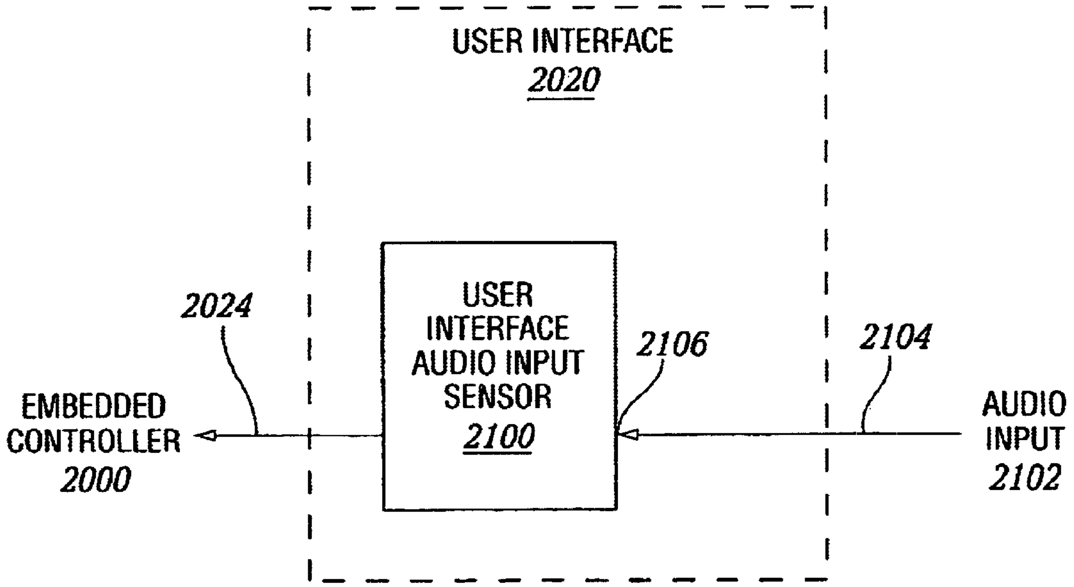
FIG. 41 depicts a detail system block diagram of user interface 2020 as shown in FIG. 36 in accordance with certain embodiments supporting a user interface audio input sensor providing an user audio input data stream.

FIG. 41 depicts a detail system block diagram of user interface 2020 as shown in FIG. 36 in accordance with certain embodiments supporting a user interface audio input sensor 2100 providing 2024 an user audio input data stream to the embedded controller 2000. Note that in certain embodiments, audio input sensor 2100 may include an A/D converter coupling audio input 2102 to output coupling 2024. In certain further embodiments, audio input sensor 2100 may further include an amplifier coupled between the A/D converter and audio input 2102. In certain further embodiments, audio input sensor 2100 may further include a filter coupled between the A/D converter and the audio amplifier.

Figure 42:
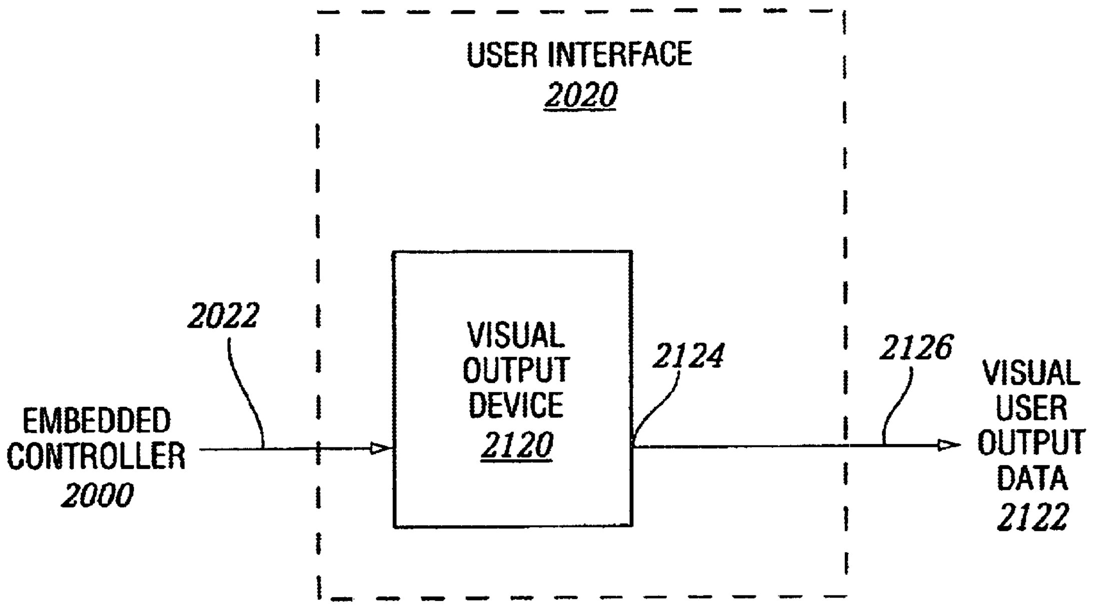
FIG. 42 depicts a detail system block diagram of user interface 2020 as shown in FIG. 36 in accordance with certain embodiments supporting a visual output device providing visual output of the user output data.

FIG. 42 depicts a detail system block diagram of user interface 2020 as shown in FIG. 36 in accordance with certain embodiments supporting a visual output device 2120 providing visual output 2122 of the user output data 2022. The visual output device 2120 in certain embodiments includes but is not limited to a Light Emitting Diode Device (LED), which may further include a multiplicity of Light Emitting Diode components. The visual output device 2120 in certain embodiments may include but is not limited to a flat panel display device such as found in a variety of calculators, handheld computers and notebook computers.

Figure 43:
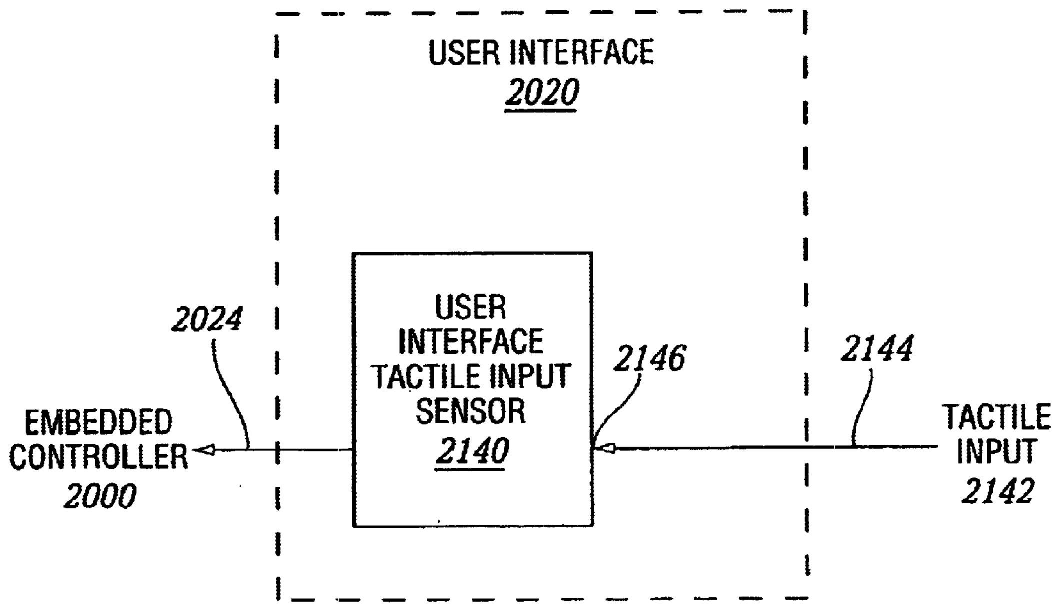
FIG. 43 depicts a detail system block diagram of user interface 2020 as shown in FIG. 36 in accordance with certain embodiments supporting a user interface tactile input sensor providing an user tactile input data stream.
Figure 44:
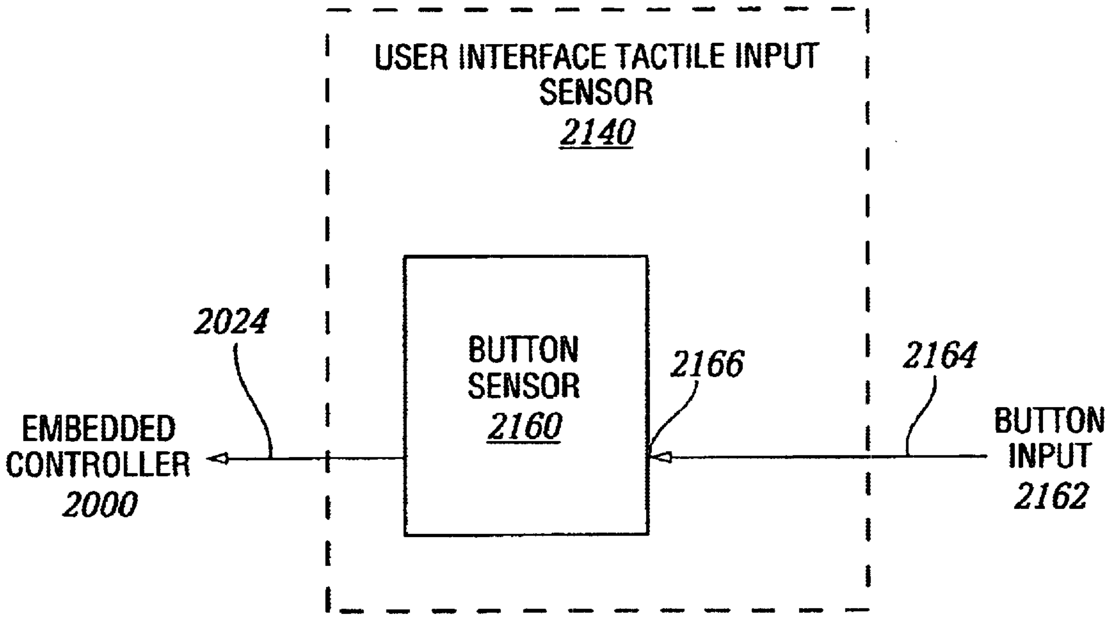
FIG. 44 depicts a detail system block diagram of user interface tactile input sensor 2140 as shown in FIG. 43 in accordance with certain embodiments supporting a user interface tactile input sensor including a button sensor.
Figure 46:
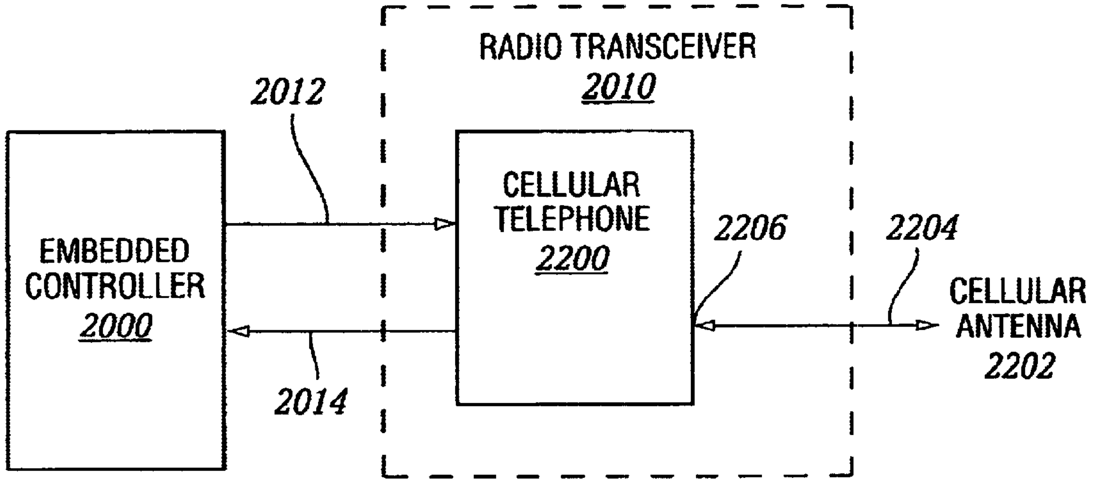
FIG. 46 depicts a detail system block diagram of radio transceiver 2010 as shown in FIG. 36 in accordance with certain embodiments supporting the radio transceiver including a cellular telephone.

FIG. 43 depicts a detail system block diagram of user interface 2020 as shown in FIG. 36 in accordance with certain embodiments supporting a user interface tactile input sensor 2140 providing an user tactile input data stream 2024. FIGS. 44 and 46 demonstrate two embodiments of devices included in user interface tactile input sensor 2140 providing tactile input support. Such figures are not meant to limit the scope of user tactile input, but rather to provide examples advantageous in certain applications. Other examples include but are not limited to touch pads and proximity sensors.

FIG. 44 depicts a detail system block diagram of user interface tactile input sensor 2140 as shown in FIG. 43 in accordance with certain embodiments supporting a user interface tactile input sensor 2140 including a button sensor 2160. Button sensor 2160 includes a button input port 2166 coupled 2164 to button input 2162. In certain embodiments, button input 2162 includes multiple buttons and an interface circuit. In certain embodiments, button input 2162 included button debounce circuitry. In certain embodiments, button input 2162 provides a binary state value related to pushing or not pushing the related button. In certain embodiments, button input 2162 further provides more detailed motion related information, such as key acceleration and release.

Figure 45:
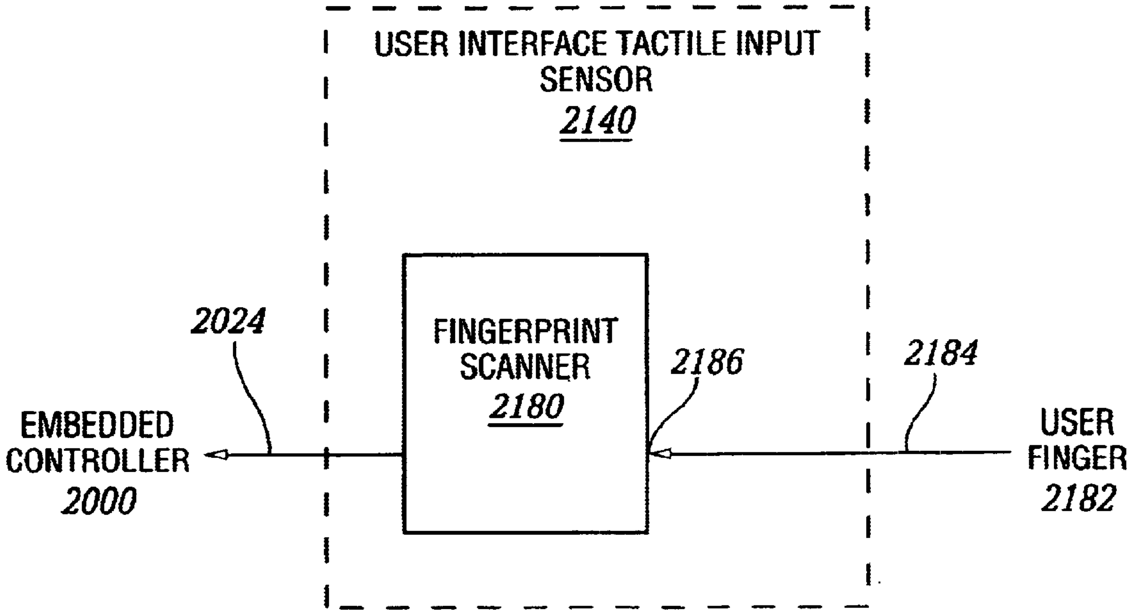
FIG. 45 depicts a detail system block diagram of user interface tactile input sensor 2140 as shown in FIG. 43 in accordance with certain embodiments supporting a user interface tactile input sensor including a fingerprint scanner.

FIG. 45 depicts a detail system block diagram of user interface tactile input sensor 2140 as shown in FIG. 43 in accordance with certain embodiments supporting a user interface tactile input sensor 2140 including a fingerprint scanner 2180. The coupling 2184 of user finger 2182 to input port 2186 of fingerprint scanner 2180 may include a CCD array in certain embodiments. In certain further embodiments, input coupling 2184 may further include a pressure sensor to indicate when user finger 2182 is positioned for a fingerprint scan. In certain alternative embodiments, input port 2186 may include a CCD array.

FIG. 46 depicts a detail system block diagram of radio transceiver 2010 as shown in FIG. 36 in accordance with certain embodiments supporting the radio transceiver 2010 including a cellular telephone 2200. Cellular telephone 2202 is coupled 2204 to cellular antenna 2202 and antenna port 2206, which is included in cellular telephone 2200. Cellular telephone 2200 receives 2012 transaction output messages from embedded controller 2000. These messages are transformed into a modulated RF output signal injected at 2206 through the coupling 2204 to be transmitted by cellular antenna 2202. Cellular telephone 2200 receives a modulated input at 2206 from the coupled 2204 cellular antenna 2202, which is then demodulated, decoded and used to create the transaction input stream 2014, which is then accessible by embedded controller 2000 using coupling 2014.

Figure 47:
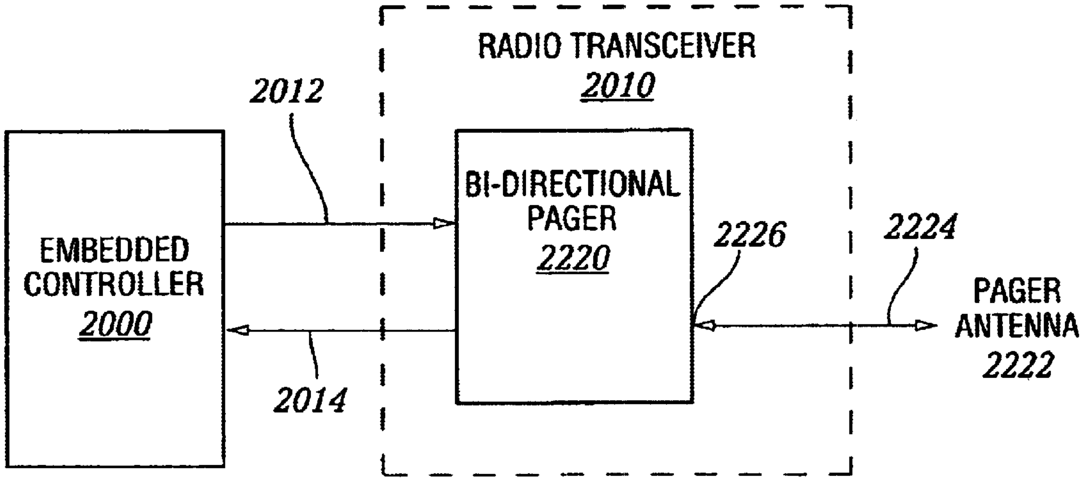
FIG. 47 depicts a detail system block diagram of radio transceiver 2010 as shown in FIG. 36 in accordance with certain embodiments supporting the radio transceiver including a bi-directional pager.

FIG. 47 depicts a detail system block diagram of radio transceiver 2010 as shown in FIG. 36 in accordance with certain embodiments supporting the radio transceiver 2010 including a bi-directional pager 2220. Bi-directional pager 2220 is coupled 2224 to pager antenna 2222 and pager antenna port 2226, which is included in bi-directional pager 2220. Bi-directional pager 2220 receives 2012 transaction output messages from embedded controller 2000. These messages are transformed into a modulated RF output signal injected at 2226 through the coupling 2224 to be transmitted by pager antenna 2222. Bi-directional pager 2220 receives a modulated input at 2226 from the coupled 2224 pager. Antenna 2222, which is then demodulated, decoded and used to create the transaction input stream 2014, which is then accessible by embedded controller 2000 using coupling 2014.

The preceding embodiments have been provided by way of example and are not meant to constrain the scope of the following claims.

What is claimed is:

1. A method of using a vehicular radio-based program selection and ordering system comprising:

receiving information for a radio program presentation;

selecting a radio program near the time of said radio program presentation;

accepting a radio program selection confirmation from a vehicle owner;

responding to said radio program selection confirmation;

providing a radio transceiver;

wherein said radio transceiver connects with an ordering system and initiates an order transaction session using said program selection confirmation;

providing vehicle owner identification means on said vehicular radio-based program selection and ordering system for verifying said vehicle owner's identity;

initializing an owner identifying signature sequence on said vehicular radio-based program selection and ordering system;

wherein said vehicle owner identification means further comprises speaking said owner identifying signature sequence; and wherein said vehicle owner identification means sends a stolen device report via said radio transceiver if said vehicle owner verification fails.

2. A method of using a vehicular radio-based program selection and ordering system as recited in claim 1 wherein selecting said radio program further comprises:

acoustic signaling selecting of said radio program.

3. A method of using a vehicular radio-based program selection and ordering system as recited in claim 1 wherein selecting said radio program further comprises:

pushing at least one button to signal selecting of said radio program.

4. A method of using a vehicular radio-based program selection and ordering system as recited in claim 1 wherein perceiving said radio program selection confirmation further comprises:

hearing a radio program selection description.

5. A method of using a vehicular radio-based program selection and ordering system as recited in claim 1 wherein perceiving said radio program selection confirmation further comprises:

reading a radio program selection description.

6. A method of using a vehicular radio-based program selection and ordering system as recited in claim 1:

wherein responding to said radio program selection confirmation further comprises at least one of the collection comprising:

ordering said radio program selection; and canceling said radio program selection.

7. A method of using a vehicular radiobased program selection and ordering system as recited in claim 1 wherein said vehicle owner identification means further comprises:

pushing an owner identifying button sequence.

8. A method of using a vehicular radio-based program selection and ordering system as recited in claim 7 further comprises: initializing said owner identifying button sequence.

9. A method of using a vehicular radio-based program selection and ordering system as recited in claim 1 wherein said vehicle owner identification means further comprises:

pressing a fingerprint scanner.

10. A method of using a vehicular radio-based program selection and ordering system as recited in claim 9 further comprises:

initially pressing said fingerprint scanner.

11. A method of using a vehicular radio-based program selection and ordering system as recited in claim 9 wherein ordering said radio program selection further comprises:

pressing said fingerprint scanner.

12. A method of controlling a vehicular radio-based program selection and ordering system comprising:

receiving a coded radio program data channel;

sensing a radio program;

determining selection of said sensed radio program;

displaying a radio program confirmation from said received coded radio program data channel whenever said radio program is sensed;

sensing a response to said displayed radio program confirmation and said selection of said sensed radio program;

providing a radio transceiver;

wherein sensing said response to said displayed radio program confirmation further comprises at least one of a collection comprising:

determining to order said selected radio program; and determining to cancel said selected radio program;

wherein said radio transceiver connects with an ordering system and sends a radio program buy message for said selected radio program whenever determining to order said selected radio program is asserted;

providing user identification means on said vehicular radio-based program selection and ordering system for verifying an authorized users identity;

initializing an owner identifying signature sequence on said vehicular radio-based program selection and ordering systems;

wherein said vehicle owner identification means further comprises speaking said owner identifying signature sequence; and wherein said user identification means sends a stolen device report via said radio transceiver if said authorized user verification fails.

13. A method of controlling a vehicular radio-based program selection and ordering system as recited in claim 12 wherein receiving a coded radio program data channel further comprises sensing an internal radio program data channel; and processing said sensed internal radio program data channel to create a radio program data descriptor stream.

14. A method of controlling a vehicular radio-based program selection and ordering system as recited in claim 13 wherein sensing said radio program further comprises sensing a radio program channel number to create a sensed radio channel number; and decoding said radio program data descriptor stream based upon said sensed radio channel number to create a radio program data descriptor for said sensed radio program.

15. A method of controlling a vehicular radio-based program selection and ordering as recited in claim 12 wherein displaying said radio program confirmation further comprises:

generating a radio program confirmation text; and displaying said radio program confirmation text.

16. A method of controlling a vehicular radio-based program selection and ordering system as recited in claim 12 further comprising:

sensing a vehicle internal audio feedback channel to create a sensed vehicle audio feedback stream; and processing said sensed vehicle audio feedback to create a processed vehicle audio feedback; and wherein determining selection of said sensed radio program further comprises determining said processed vehicle audio feedback to create said determined selection of said sensed radio program.

17. A method of controlling a vehicular radio-based program selection and ordering system as recited in claim 16, wherein determining to order said selected radio program further comprises determining said processed vehicle audio feedback to create said determined ordering of said selected radio program.

18. A method of controlling a vehicular radio-based program selection and ordering system as recited in claim 12, wherein displaying said radio program confirmation text further comprises:

audio processing said radio program confirmation text to create an audio radio program confirmation script; and sending said audio radio program confirmation script to an audio output device.

19. A method of controlling a vehicular radio-based program selection and ordering system as recited in claim 12 wherein displaying said radio program confirmation text further comprises:

sending a buy query for said selected radio program to said ordering system via said radio transceiver;

receiving a response to said selected radio program buy query via said radio transceiver; and generating said radio program confirmation text from said selected radio program buy query response.

20. A method of controlling a vehicular radio-based program selection and ordering system as recited in claim 12 wherein displaying said radio program confirmation text further comprises:

presenting said radio program confirmation text to a visual output device.

21. A method of controlling a vehicular radio-based program selection and ordering system as recited in claim 12 further comprising at least one of the collection comprising:

initializing use for an authorized user to create a signature for said specific user; and initializing a usage session for a first user utilizing said signature for said authorized user.

22. A method of controlling a vehicular radio-based program selection and ordering system as recited in claim 21 wherein initializing a usage session for said first user further comprises:

sampling said first user response to create a first user signature;

comparing said first user signature with said signature of said authorized user to create a signature comparison;

blocking access by said first user whenever said comparison is non-matching.

23. A method of controlling a vehicular radio-based program selection and ordering system as recited in claim 12 implemented as a computer program residing in computer readable memory.

24. A method of controlling a vehicular radio-based program selection and ordering system as recited in claim 23 wherein said computer readable memory resides in a removable storage device which when engaged by a removable storage interface may be accessed by a computer.

25. A radio for receiving a radio program data channel, and conducting transactions comprising:

an embedded controller further comprising a computer readable memory containing a writeable non-volatile memory component;

a receiver of said radio program data channel coupled to said embedded controller generating a radio program data channel stream readably accessible by said embedded controller;

a radio transceiver coupled to said embedded controller receiving from said embedded controller transaction output messages and sending said transaction output messages to an ordering system;

a user interface circuit coupled to said embedded controller generating user selection data readably accessible by said embedded controller;

wherein said radio transceiver receives a transaction input stream from said ordering system readably accessible by said embedded controller;

wherein said user Interface circuit receives from said embedded controller user output data;

wherein said embedded controller initializes an owner identifying signature sequence:

wherein said user interface circuit receives user input data from a user;

wherein said user interface circuit receives a user speaking said owner identifying signature sequence; and wherein said user interface circuit sends a stolen device report via said radio transceiver if an unauthorized user accesses said user interface circuit.

26. A radio for receiving a radio program data channel, and conducting transactions as recited in claim 25 further comprising:

an external IF signal Input port; and wherein said radio program data channel receiver includes a radio program data channel isolator containing an input port coupled to said external IF input signal and further containing a digital output port coupled to said embedded controller providing said radio program data channel stream.

27. A radio for receiving a radio program data channel, and conducting transactions as recited in claim 26 further comprising:

wherein said external IF signal input port supports an analog signal protocol; and wherein said radio program data channel isolator further comprises:

an analog isolation circuit including a first analog Input port coupled to said external IF input port;

a first digital output port coupled to said radio program data channel isolator digital output; and an A/D converter further comprising:

a second analog input port coupled to said first analog input port; and a second digital output port coupled to said first digital output port.

28. A radio for recording a radio program data channel, and conducting transactions as recited in claim 27 wherein said analog isolation circuit further comprises:

a bandpass filter containing an input port coupled to said external IF input signal and further containing a output port coupled to said AND converter input port.

29. A radio for receiving a radio program data channel, and conducting transactions as recited in claim 25 wherein said user interface circuit further comprises:

a user interface audio output interface providing audio output of said user output data.

30. A radio for receiving a radio program data channel, and conducting transactions as recited in claim 25 wherein said user interface circuit further comprises;

a user interface audio input sensor providing an user audio input data stream to said embedded controller.

31. A radio for receiving a radio program data channel, and conducting transactions as recited in claim 25 wherein said user interface circuit further comprises:

a visual output device providing visual output of said user output data.

32. A radio for receiving a radio program data channel, and conducting transactions as recited in claim 25 wherein said user interface circuit further comprises:

a user interface tactile input sensor providing an user tactile input data stream.

33. A radio for receiving a radio program data channel, and conducting transactions as recited in claim 32 wherein said user interface tactile input sensor further comprises:

a button sensor.

34. A radio for receiving a radio program data channel, and conducting transactions as recited in claim 32 wherein said user Interface tactile input sensor further comprises:

a fingerprint scanner.

35. A radio for receiving a radio program data channel, and conducting transactions as recited in claim 25 wherein said radio transceiver comprises:

a cellular telephone.

36. A radio for receiving a radio program data channel, and conducting transactions as recited in claim 25 wherein said radio transceiver comprises:

a bi-directional pager.

* * * * *